(12) United States Patent
Fukawatase

(10) Patent No.: US 8,267,427 B2
(45) Date of Patent: Sep. 18, 2012

(54) KNEE AIRBAG DEVICE FOR FRONT PASSENGER SEAT

(75) Inventor: Osamu Fukawatase, Nishikamo-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 12/988,038

(22) PCT Filed: Oct. 29, 2008

(86) PCT No.: PCT/JP2008/069627
§ 371 (c)(1),
(2), (4) Date: Oct. 15, 2010

(87) PCT Pub. No.: WO2010/050009
PCT Pub. Date: May 6, 2010

(65) Prior Publication Data
US 2011/0193328 A1 Aug. 11, 2011

(51) Int. Cl.
*B60R 21/16* (2006.01)
(52) U.S. Cl. .......... 280/743.1; 280/743.2; 280/750; 280/751; 280/752
(58) Field of Classification Search .......... 280/743.1, 280/743.2, 750, 751, 752
See application file for complete search history.

(56) References Cited

U.S. PATENT DOCUMENTS

| | | | |
|---|---|---|---|
| 6,155,595 A | 12/2000 | Schultz | |
| 6,435,554 B1 * | 8/2002 | Feldman | 280/743.2 |
| 6,705,638 B2 | 3/2004 | Abe et al. | |
| 6,955,377 B2 * | 10/2005 | Cooper et al. | 280/743.1 |
| 7,055,858 B2 * | 6/2006 | Takimoto et al. | 280/743.1 |
| 7,261,318 B2 | 8/2007 | Enders | |
| 7,350,801 B2 * | 4/2008 | Nakayama | 280/730.1 |
| 7,452,002 B2 * | 11/2008 | Baumbach et al. | 280/743.2 |
| 7,604,252 B2 * | 10/2009 | Heitplatz et al. | 280/730.1 |
| 7,648,161 B2 * | 1/2010 | Kai | 280/730.2 |

(Continued)

FOREIGN PATENT DOCUMENTS

JP A-11-321539 11/1999

(Continued)

OTHER PUBLICATIONS

International Search Report mailed Jan. 20, 2009 issued in International Patent Application No. PCT/JP2008/069627 (with translation).

(Continued)

*Primary Examiner* — Toan To
(74) *Attorney, Agent, or Firm* — Oliff & Berridge, PLC

(57) ABSTRACT

At the time of a frontal collision of a vehicle, even in a case in which knee regions of an occupant are in a state of being close to a housing of a knee airbag, the knee regions can be appropriately restrained with the knee airbag. When knee airbag 14 receives a supply of gas and expands and deploys towards the occupant side in the front passenger seat, expansion and deployment of a central region 14A of knee airbag 14 is suppressed by a flap 16 (a deployment control cloth), and end portion regions 14B expand and deploy before central portion 14A. Since these end portion regions 14B respectively expand and deploy from between the knee regions of an occupant and glove box door 24 towards the outer sides of the knee regions, a reaction force of knee airbag 14 with respect to the knee regions can be weakened.

7 Claims, 18 Drawing Sheets

U.S. PATENT DOCUMENTS

| | | |
|---|---|---|
| 7,661,700 B2 * | 2/2010 | Imamura et al. ............ 280/730.1 |
| 8,096,578 B2 * | 1/2012 | Wigger et al. ................ 280/732 |
| 2004/0178616 A1 * | 9/2004 | Yoshikawa ................... 280/748 |
| 2007/0007757 A1 | 1/2007 | Bauer et al. |
| 2008/0111360 A1 | 5/2008 | Jeong |

FOREIGN PATENT DOCUMENTS

| | | |
|---|---|---|
| JP | A-2000-16213 | 1/2000 |
| JP | A-2000-247199 | 9/2000 |
| JP | A-2002-356137 | 12/2002 |
| JP | A-2003-205816 | 7/2003 |
| JP | A-2007-45241 | 2/2007 |
| JP | A-2007-62446 | 3/2007 |
| JP | A-2007-161090 | 6/2007 |

OTHER PUBLICATIONS

Supplementary European Search Report dated Mar. 16, 2012 in European Application No. EP 08 87 7721.

* cited by examiner

KNEE AIRBAG DEVICE FOR FRONT PASSENGER SEAT

TECHNICAL FIELD

The present invention relates to a knee airbag device for a front passenger seat.

BACKGROUND ART

A knee airbag device, having a glove box door, in which an airbag module is mounted to the glove box door, has been disclosed (see patent document 1 and patent document 2).
Patent Document 1: Japanese Patent Application Laid-Open (JP-A) No. 2002-356137
Patent Document 2: JP-A No. 2007-161090

DISCLOSURE OF THE INVENTION

Problem to be Solved by the Invention

The position of the knee regions of a seated occupant in a vehicle seat changes depending on the body type of an occupant and a front-rear position of the vehicle seat, and as such the position of the knee regions may be well separated from an instrument panel or a glove box door which act as a housing of the knee airbag, or the position of the knee regions may be close to the housing.

However, in each of the aforementioned conventional examples, such positions of the knee regions of an occupant are not considered.

In consideration of the above facts, the present invention is intended to allow, at the time of a frontal collision of a vehicle, appropriate restraint of the knee regions with a knee airbag even when the knee regions of an occupant are in a state of being close to the housing of the knee airbag.

Means for Solving the Problem

A first embodiment of the present invention is a knee airbag that is stored in a housing in a folded state when not deployed, the knee airbag including a central region in the vehicle width direction and end portion regions positioned at either side of the central region in the vehicle width direction and at the vehicle front of the knee regions of an occupant seated in the front passenger seat, the knee airbag receiving a supply of gas at the time of a frontal collision of the vehicle and being configured so as to be capable of being expanded and deployed towards the side of the knee regions; and a deployment control cloth including a general portion configured to be narrower in the vehicle width direction than the knee airbag in a folded state, the general portion disposed so as to extend over the central region of the knee airbag in the vehicle vertical direction from the vehicle rear side, the deployment control cloth suppressing expansion and deployment of the central region at the time of initial expansion and deployment of the knee airbag and initializing expansion and deployment of the end portion regions towards the outer sides in the vehicle width direction before expansion and deployment of the central region.

In the knee airbag device for a front passenger seat according to the first embodiment of the present invention, a knee airbag which is stored in a housing in a folded state receives a supply of gas at the time of a frontal collision of a vehicle and expands and deploys towards the side of the knee regions of an occupant seated in the front passenger seat. At this time, expansion and deployment of the central region of the knee airbag is suppressed by the deployment control cloth, and the end portion regions positioned at either side of the central region in the vehicle width direction and at the vehicle front of the knee regions of an occupant expand and deploy before the central region.

Here, in a case in which the knee regions of an occupant are in a state of being close to the housing of the knee airbag at the time of a frontal collision of a vehicle, since end portion regions of either side of the knee airbag respectively expand and deploy from between the housing of the knee airbag and the knee regions of an occupant towards the outer sides of the knee regions, a reaction force of the knee airbag with respect to the knee regions is weakened. Consequently, even in a case in which the knee regions of an occupant are in a state of being close to the housing of the knee airbag, the knee regions can be appropriately restrained with the knee airbag at the time of a frontal collision of a vehicle.

In a second embodiment of the present invention, in the knee airbag device for a front passenger seat according to the first embodiment, after being folded in the vehicle vertical direction, the knee airbag is folded from both sides in the vehicle width direction towards the center in the vehicle width direction and the folded portions in the vehicle width direction are disposed at the end portion regions, and the general portion of the deployment control cloth is disposed so as to cover a part of the folded portions in the vehicle width direction from the vehicle rear side.

In the knee airbag device for a front passenger seat according to the second embodiment of the present invention, after being folded in the vehicle vertical direction, the knee airbag is folded from both sides in the vehicle width direction towards the center in the vehicle width direction and the folded portions in the vehicle width direction are disposed at the end portion regions, and since the general portion of the deployment control cloth is disposed so as to cover a part of the folded portions in the vehicle width direction disposed at end portion regions of the knee airbag, from the vehicle rear side, the folded portions in the vehicle width direction can be stably held by the general portion of the deployment control cloth at normal times, and at a time of expansion and deployment of the knee airbag, the folded portions in the vehicle width direction break away from the general portion of the deployment control cloth and the end portion regions can rapidly expand and deploy to the vehicle front of the knee regions of an occupant. Consequently, while stabilizing the folded state of the knee airbag when not deployed, the knee regions of an occupant can be appropriately restrained with the knee airbag at the time of a frontal collision of a vehicle.

In a third embodiment of the present invention, in the knee airbag device for a front passenger seat according to the first embodiment or the second embodiment, one end portion of the deployment control cloth in the vehicle vertical direction is held in place between the housing and the knee airbag, and the other end portion of the deployment control cloth in the vehicle vertical direction is disposed between at least the knee airbag and a vertical wall portion of the housing and, at the time of initial expansion and deployment of the knee airbag, is fixed and held between the vertical wall portion and the knee airbag by expansion pressure.

In a knee airbag device for a front passenger seat according to the third embodiment of the present invention, one end portion of a deployment control cloth in the vehicle vertical direction is held in place between a knee airbag and a housing of the knee airbag, and the other end portion of the deployment control cloth in the vehicle vertical direction is at least disposed between the knee airbag and a vertical wall portion of the housing and, at the time of initial expansion and deployment of the knee airbag, the other end portion of the deployment control cloth is fixed and held between at least the vertical wall portion and the knee airbag in the housing by expansion pressure of the knee airbag. As a result thereof, at the time of initial expansion and deployment of the knee airbag, expansion and deployment of the central region of the knee airbag is suppressed by the general portion of the deployment control cloth, and expansion and deployment of end portion regions of the knee airbag precedes expansion and deployment of the central region. Consequently, even in a case in which the knee regions of an occupant in the front passenger seat are in a state of being close to the housing of the knee airbag, the knee regions can be appropriately restrained with the knee airbag at the time of a frontal collision of a vehicle.

When expansion and deployment of the knee airbag further progresses and a tensile force which occurs at the deployment control cloth increases, the other end portion of the deployment control cloth fixed and held between the knee airbag and the vertical wall portion of the housing breaks away from between the knee airbag and the vertical wall portion. As a result thereof, since suppression of expansion and deployment of the central region of the knee airbag is removed, expansion and deployment of the central region progresses and, ultimately, the knee airbag can be expanded and deployed to its full size. Consequently, at the time of a frontal collision of a vehicle, when the knee regions of an occupant in the front passenger seat are well separated from the housing of the knee airbag and not in a state of being close to the housing of the knee airbag, a reaction force of the knee airbag with respect to the knee regions is sufficiently established and the knee regions can be appropriately restrained.

In a fourth embodiment of the present invention, in the knee airbag device for a front passenger seat according to the first embodiment or the second embodiment, both end portions of the deployment control cloth in the vehicle vertical direction are respectively held in place between the housing and the knee airbag, and a designated rupture portion, which ruptures when a tensile force which is equal to or greater than a predetermined amount occurs at the general portion, is provided at the general portion of the deployment control cloth.

In a knee airbag device for a front passenger seat according to the fourth embodiment of the present invention, since both end portions of the deployment control cloth in the vehicle vertical direction are respectively held in place between the housing and the knee airbag, at the time of initial expansion and deployment of the knee airbag, expansion and deployment of the central portion of the knee airbag is stably suppressed by the deployment control cloth and expansion and deployment of the end portion regions of the knee airbag precedes expansion and deployment of the central region. Consequently, at the time of a frontal collision of a vehicle, even in a case in which the knee regions of an occupant in the front passenger seat are in a state of being close to the housing of the knee airbag, the knee regions can be appropriately restrained with the knee airbag.

When expansion and deployment of the knee airbag further progresses and a tensile force occurring at the general portion of the deployment control cloth becomes equal to or greater than a predetermined amount, the designated rupture portion provided at the general portion ruptures. Consequently, since suppression of expansion and deployment of the central region of the knee airbag is removed, the knee airbag can be expanded and deployed to its full size. For this reason, at the time of a frontal collision of a vehicle, when the knee regions of an occupant in the front passenger seat are well separated from the housing of the knee airbag and not in a state of being close to the housing of the knee airbag, a reaction force of the knee airbag with respect to the knee regions is sufficiently established and the knee regions can be appropriately restrained.

In a fifth embodiment of the present invention, in the knee airbag device for a front passenger seat according to any one of the first embodiment to the fourth embodiment, surplus length portions having a length corresponding to a permissible bulge amount of the central region towards the occupant side at the time of initial expansion and deployment of the knee airbag are provided at the general portion of the deployment control cloth.

In a knee airbag device for a front passenger seat according to the fifth embodiment of the present invention, since surplus length portions are provided at the general portion of the deployment control cloth, the central region of the knee airbag can rapidly bulge towards the occupant side until the surplus length portions completely extend at the time of initial expansion and deployment of the knee airbag. When the surplus length portions completely extend, a tensile force occurs at the deployment control cloth and expansion and deployment of the central region of the knee airbag is suppressed. Consequently, at the time of initial expansion and deployment of the knee airbag, expansion and deployment of the central region can be suppressed after the central region of the knee airbag rapidly bulges towards the occupant side, and expansion and deployment of the end portion regions can precede expansion and deployment of the central region.

In a sixth embodiment of the present invention, in the knee airbag device for a front passenger seat according to the fifth embodiment, the surplus length portions are folded over the central region of the knee airbag when not deployed and are sewn at controlled sewn portions which are breakable under a tensile force which occurs at the deployment control cloth at the time of expansion and deployment of the knee airbag.

In a knee airbag device for a front passenger seat according to the sixth embodiment of the present invention, when not deployed, the surplus length portions of the general portion of the deployment control cloth are folded over the central region of the knee airbag and are sewn at controlled sewn portions. These controlled sewn portions break due to a tensile force which occurs at the deployment control cloth at the time of expansion and deployment of the knee airbag. Due to the controlled sewn portions breaking, deployment and extension of the folded surplus length portions is possible. Consequently, while stabilizing the state of the surplus length portions when not deployed, at the time of expansion and deployment of the knee airbag, the central region of the knee airbag rapidly bulges towards the occupant side within the range of the surplus length portions and, after the surplus length portions have fully extended, expansion and deployment of the central region is suppressed and expansion and deployment of the end portion regions can precede expansion and deployment of the central region.

In a seventh embodiment of the present invention, in the knee airbag device for a front passenger seat according to any one of the first embodiment to the sixth embodiment, in the vehicle width direction, a width dimension of the general portion of the deployment control cloth is configured to be one third or less of a width dimension of the knee airbag in a folded state.

In a knee airbag device for a front passenger seat according to the seventh embodiment of the present invention, since the width dimension of the general portion of the deployment control cloth is configured to be one third or less of the width dimension of the knee airbag in a folded state, the end portions regions can be expanded and deployed over a wider range at the time of initial expansion and deployment of the knee airbag. For this reason, at the time of a frontal collision of a vehicle, even in a case in which the knee regions of an occupant of the front passenger seat are in a state of being close to the housing of the knee airbag and a center position of the knee airbag and a center position between both of the knee regions of an occupant are offset in the vehicle width direction, the end portion regions of the knee airbag are respectively expanded and deployed between the housing and the knee regions of the occupant, and the knee regions can be appropriately restrained.

In an eighth embodiment of the present invention, in the knee airbag device for a front passenger seat according to any one of the first embodiment to the seventh embodiment, the housing is provided inside the glove box door which constitutes the occupant side exterior wall of the glove box of a vehicle.

In a knee airbag device for a front passenger seat according to the eighth embodiment of the present invention, since the housing of the knee airbag is provided inside the glove box door which constitutes the occupant side exterior wall of the glove box, at the time of a frontal collision of a vehicle, the knee airbag can be rapidly deployed between the glove box door and the knee regions of an occupant of the front passenger seat. For this reason, restrainability for the knee regions of an occupant of a front passenger seat can be enhanced.

Effects of the Invention

As explained above, according to the knee airbag device for a front passenger seat according to the first embodiment of the present invention, an exceptional effect can be obtained whereby it is possible to appropriately restrain the knee regions of an occupant with a knee airbag at the time of a frontal collision of a vehicle even when the knee regions of the occupant are in a state of being close to the housing of the knee airbag.

According to the knee airbag device for a front passenger seat according to the second embodiment of the present invention, an exceptional effect can be obtained whereby it is possible to appropriately restrain the knee regions of an occupant with a knee airbag at the time of a frontal collision of a vehicle while stabilizing the folded state of the knee airbag when not deployed.

According to the knee airbag device for a front passenger seat according to the third embodiment of the present invention, an exceptional effect can be obtained whereby it is possible to appropriately restrain the knee regions of an occupant with a knee airbag at the time of a frontal collision of a vehicle regardless of whether or not the knee regions of the occupant in the front passenger seat are in a state of being close to the housing of the knee airbag.

According to the knee airbag device for a front passenger seat according to the fourth embodiment of the present invention, an exceptional effect can be obtained whereby it is possible to appropriately restrain the knee regions of an occupant with a knee airbag at the time of a frontal collision of a vehicle regardless of whether or not the knee regions of the occupant in the front passenger seat are in a state of being close to the housing of the knee airbag.

According to the knee airbag device for a front passenger seat according to the fifth embodiment of the present invention, an exceptional effect can be obtained whereby, after the central region of the knee airbag is made to rapidly bulge towards the occupant side, it is possible to suppress expansion and deployment of the central region and make expansion and deployment of the end portions regions precede expansion and deployment of the central region at the time of initial expansion and deployment of the knee airbag.

According to the knee airbag device for a front passenger seat according to the sixth embodiment of the present invention, an exceptional effect of, while stabilizing the state of the surplus length portions when not deployed, at the time of expansion and deployment of the knee airbag, making the central region of the knee airbag rapidly bulge towards the occupant side within the range of the surplus length portions and, after the surplus length portions have fully extended, suppressing expansion and deployment of the central region and being able to make expansion and deployment of the end portion regions precede expansion and deployment of the central region, can be obtained.

According to the knee airbag device for a front passenger seat according to the seventh embodiment of the present invention, an exceptional effect can be obtained whereby it is possible to appropriately restrain the knee regions of an occupant with a knee airbag at the time of a frontal collision of a vehicle even when the knee regions of an occupant of the front passenger seat are in a state of being close to the housing of the knee airbag, and a center position of the knee airbag and a center position between both of the knee regions of the occupant are offset in the vehicle width direction.

According to the knee airbag device for a front passenger seat according to the eighth embodiment of the present invention, an exceptional effect can be obtained whereby it is possible to enhance restrainability for the knee regions of an occupant of the front passenger seat due to the knee airbag.

BRIEF DESCRIPTION OF THE DRAWINGS

FIG. 2 is an enlarged section diagram, along line 2-2 of FIG. 1, showing a knee airbag device for a front passenger seat provided at the inside of a glove box door.

FIG. 3 is an enlarged section diagram showing a knee airbag device for a front passenger seat.

FIG. 4 is a perspective view diagram showing a knee airbag and a flap mounted in a module case.

FIG. 5 is an exploded perspective view diagram showing a knee airbag, a flap, an inflator and a module case.

FIG. 6 is a perspective view diagram showing a state in which, in the process of expansion and deployment of a knee airbag, the knee airbag begins to expand due to a part of an outer panel of a glove box door becoming an airbag door and deploying as a result of expansion pressure of the knee airbag, expansion and deployment of a central region of the knee airbag is suppressed by the flap, and the end portion regions expand and deploy before the central region.

FIG. 7 is a perspective view diagram showing a state in which, in the process of the expansion and deployment of a knee airbag, while expansion and deployment of a central region of the knee airbag is suppressed by a flap, expansion and deployment of end portion regions is further progressed than in the state shown in FIG. 6.

FIG. 8 is a perspective view diagram showing a state in which, in the process of expansion and deployment of a knee airbag, suppression of expansion and deployment of the knee airbag by a flap has been released, and the knee airbag is fully deployed.

FIG. 9 is a section diagram showing a state in which expansion and deployment of a central region of a knee airbag is suppressed by a flap, and the knee regions of an occupant close to a glove box door are restrained due to end portion regions expanding and deploying before the central region.

FIG. 10 is a section diagram showing a state in which suppression of expansion and deployment of a central region by a flap has been released, and the knee regions of an occupant are restrained due to a fully deployed airbag.

FIG. 11 is a plane view diagram showing, the relationship in a vehicle width direction between the width dimension of a general portion of a flap and the width dimension of a knee airbag in a folded state, and a state in which the knee regions are restrained by end portion regions of the knee airbag in a case in which the center location of the knee airbag and the center location between both knee regions of an occupant are offset in the vehicle width direction.

FIG. 13 is a perspective view diagram showing a knee airbag and a flap mounted in a module case.

FIG. 14 is an exploded perspective view diagram showing a knee airbag, a flap, a module case and an inflator.

FIG. 15 is a perspective view diagram showing a state in which, in the process of expansion and deployment of a knee airbag, expansion and deployment of a central region of the knee airbag is suppressed by a flap, and end portion regions are expanding and deploying before the central region.

FIG. 16 is a perspective view diagram showing a state in which, in the process of expansion and deployment of a knee airbag, suppression of expansion and deployment of the knee airbag by a flap has been released, and the knee airbag is fully deployed.

FIG. 17 is a section diagram showing a state in which expansion and deployment of a central region of a knee airbag is suppressed by a flap, and the knee regions of an occupant close to a glove box door are restrained due to end portion regions expanding and deploying before the central region.

FIG. 18 is a section diagram showing a state in which suppression of expansion and deployment of a central region by a flap has been released, and the knee regions of an occupant are restrained due to the fully deployed airbag.

BEST MODE FOR IMPLEMENTING THE INVENTION

The embodiments of the present invention are explained below based on the drawings.

First Embodiment

Figure 1:
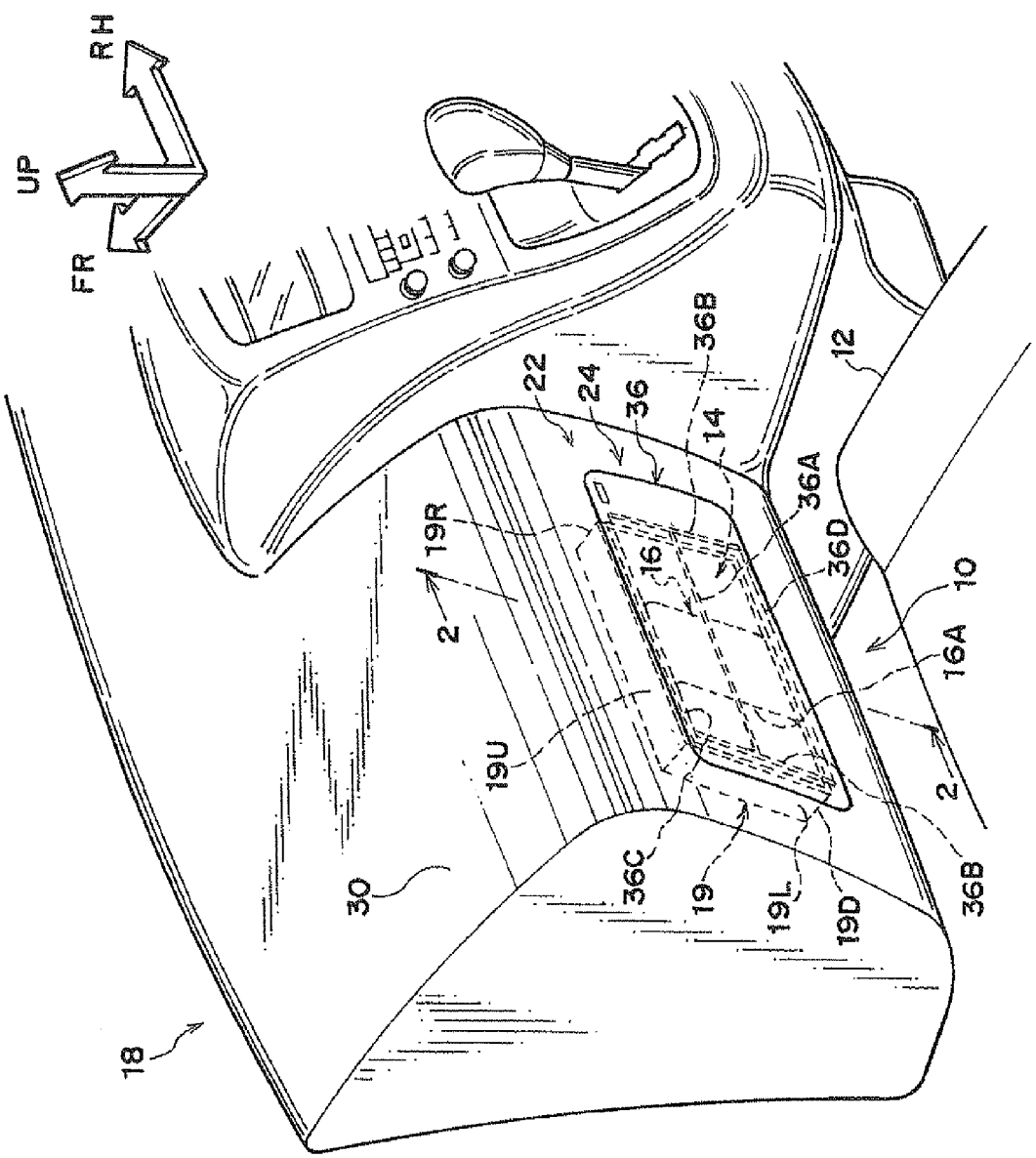
FIG. 1 to FIG. 11 relate to the first embodiment and FIG. 1 is a perspective view diagram, from the vehicle interior side, of a instrument panel of a vehicle equipped with a knee airbag device for a front passenger seat.

In FIG. 1, a knee airbag device 10 for a front passenger seat according to the present embodiment is a knee bag device which is provided to correspond to a front passenger seat 12 and includes a knee airbag 14 and a flap 16, which is one example of a deployment control cloth.

Figure 2:
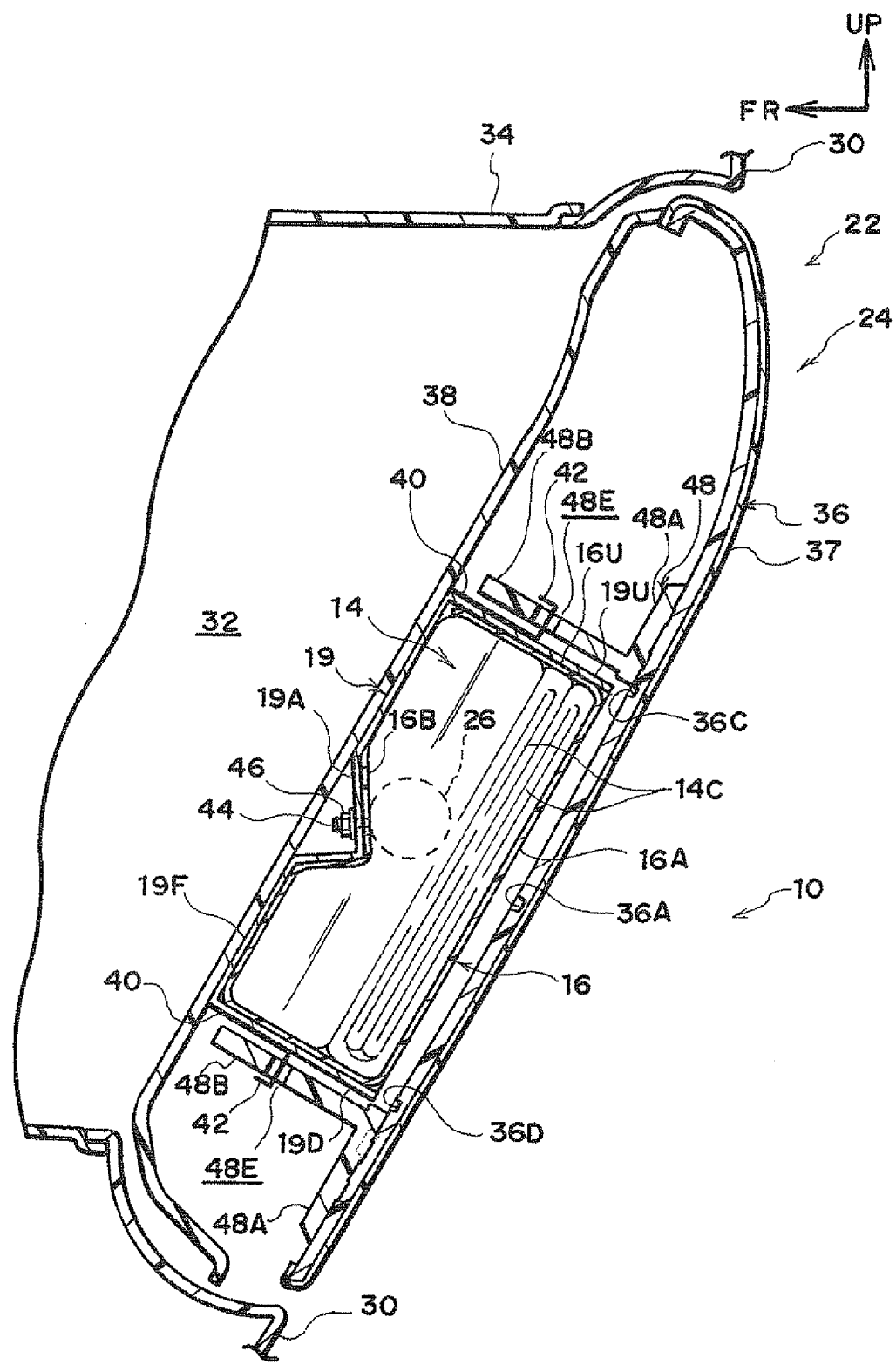

As shown in FIG. 2, knee airbag 14 is, when not deployed, a bag body which is stored in a folded state inside a module case 19, which is one example of a housing. This module case 19 is provided inside a glove box door 24 which constitutes an occupant side exterior wall of a glove box 22 of a vehicle 18. At the time of a collision of vehicle 18, knee airbag 14 receives a supply of gas from, for example, an inflator 26, and is configured so as to be able to be expanded and deployed towards the side of knee regions 28K (FIG. 9 to FIG. 11) of an occupant 28 seated in a front passenger seat 12.

Figure 11:
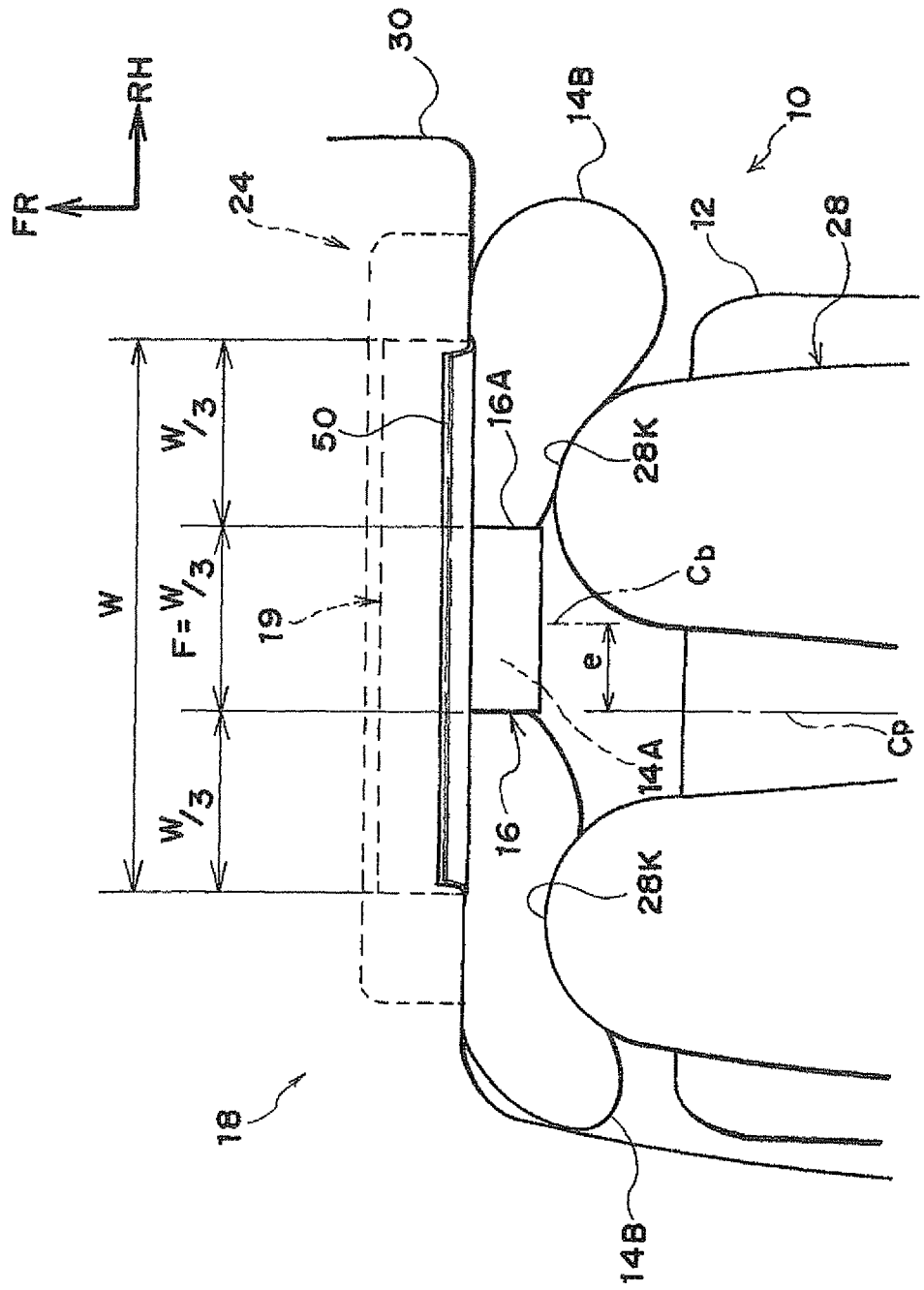

Further, as shown in FIG. 11, knee airbag 14 includes a central region 14A in the vehicle width direction, and end portion regions 14B positioned at either side of central region 14A in the vehicle width direction and at the vehicle front of knee regions 28K of occupant 28 seated in front passenger seat 12. After being folded in the vehicle vertical direction, knee airbag 14 is folded from both sides in the vehicle width direction towards the center in the vehicle width direction and folded portions 14C in the vehicle width direction are disposed at end portion regions 14B. In addition, folded portions 14C are first folded from both sides in the vehicle width direction towards the center in the vehicle width direction and then folded back again to the outer sides in the vehicle width direction within the range of end portion regions 14B. It should be noted that the number of foldings back of folded portions 14C is not limited to the example shown in the drawing.

Here, the configuration of glove box 22 is simply explained. In FIG. 1 and FIG. 2, glove box 22 is mounted and fixed in an instrument panel 30 at the front passenger seat 12 side at a position which is at the front side of the vehicle with respect to front passenger seat 12. This glove box 22 is configured to include, for example, a main body 34 which constitutes storage space 32, and glove box door 24 which constitutes the occupant side exterior wall. Main body 34 is, for example, configured as a casing which is open towards the vehicle rear side.

Glove box door 24 is a lid body which, when closed, combines an outer panel 36 positioned at an occupant side (the vehicle rear side) and an inner panel 38 positioned at the side opposite the occupant side (the vehicle front side) and establishes the storage space of the knee airbag 14 therein. Studs (not shown in the drawings) are respectively provided at both sides in the vehicle width direction of a lower end portion of glove box door 24, and glove box door 24 is mounted to the instrument panel 30 side via these studs. Further, glove box door 24 is configured to be openable and closeable with these studs as the rotation center.

As shown in FIG. 1, a horizontal designated rupture portion 36A and vertical designated rupture portions 36B are provided at outer panel 36 and are configured so as to rupture due to expansion pressure of knee airbag 14. Horizontal designated rupture portion 36A, for example, extends in the vehicle width direction at a height position corresponding to a central portion in the vehicle vertical direction of knee airbag 14 in a folded state and terminates at positions corresponding to each end portion in the vehicle width direction of knee airbag 14. Vertical designated rupture portions 36B, for example, extend in the vehicle vertical direction at positions corresponding to each end portion in the vehicle width direction of knee airbag 14 in a folded state and terminate at height positions corresponding to each end portion in the vehicle vertical direction of knee airbag 14. In other words, in a frontal view of outer panel 36, vertical designated rupture portions 36B extend in the vehicle vertical direction along a vertical wall portion 19R of the vehicle right side of module case 19 and along a vertical wall portion 19L of the vehicle left side of module case 19.

Further, as shown in FIG. 1, at outer panel 36, hinge portions 36C and 36D are provided extending in the vehicle width direction so as to connect the upper edges and lower edges of both sides of vertical designated rupture portions 36B respectively. In other words, in a frontal view of outer panel 36, hinge portions 36C and 36D each extend in the vehicle width direction along a vertical wall portion 19U at the vehicle upper side of module case 19 and along a vertical wall portion 19D at the vehicle lower side of the module case 19 respectively.

Figure 3:
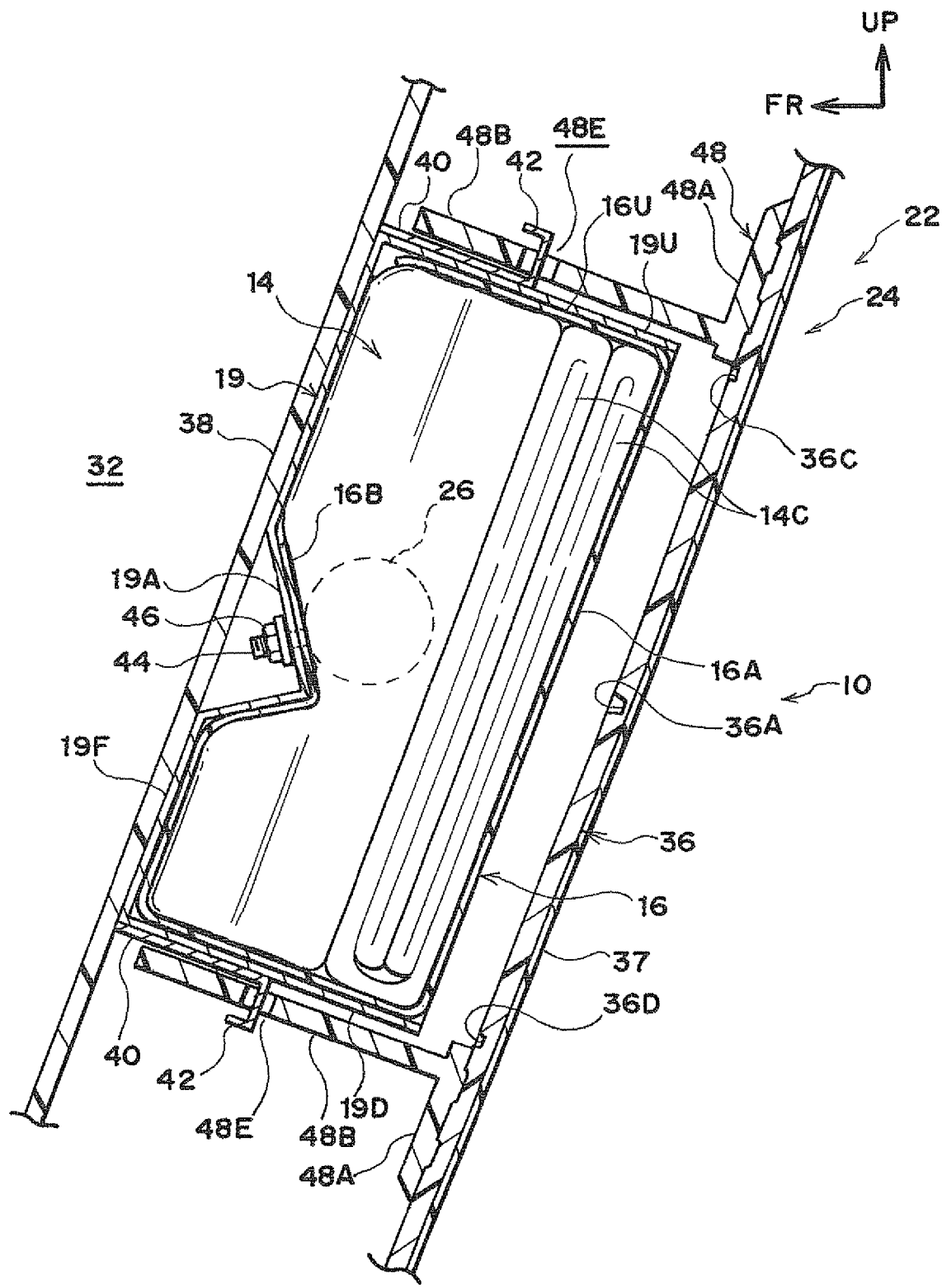

It should be noted that, as shown in FIG. 2 and FIG. 3, although the exterior surface (rear surface) of outer panel 36 is covered by an skin 37, a configuration in which skin 37 is not used is also satisfactory.

Figure 4:
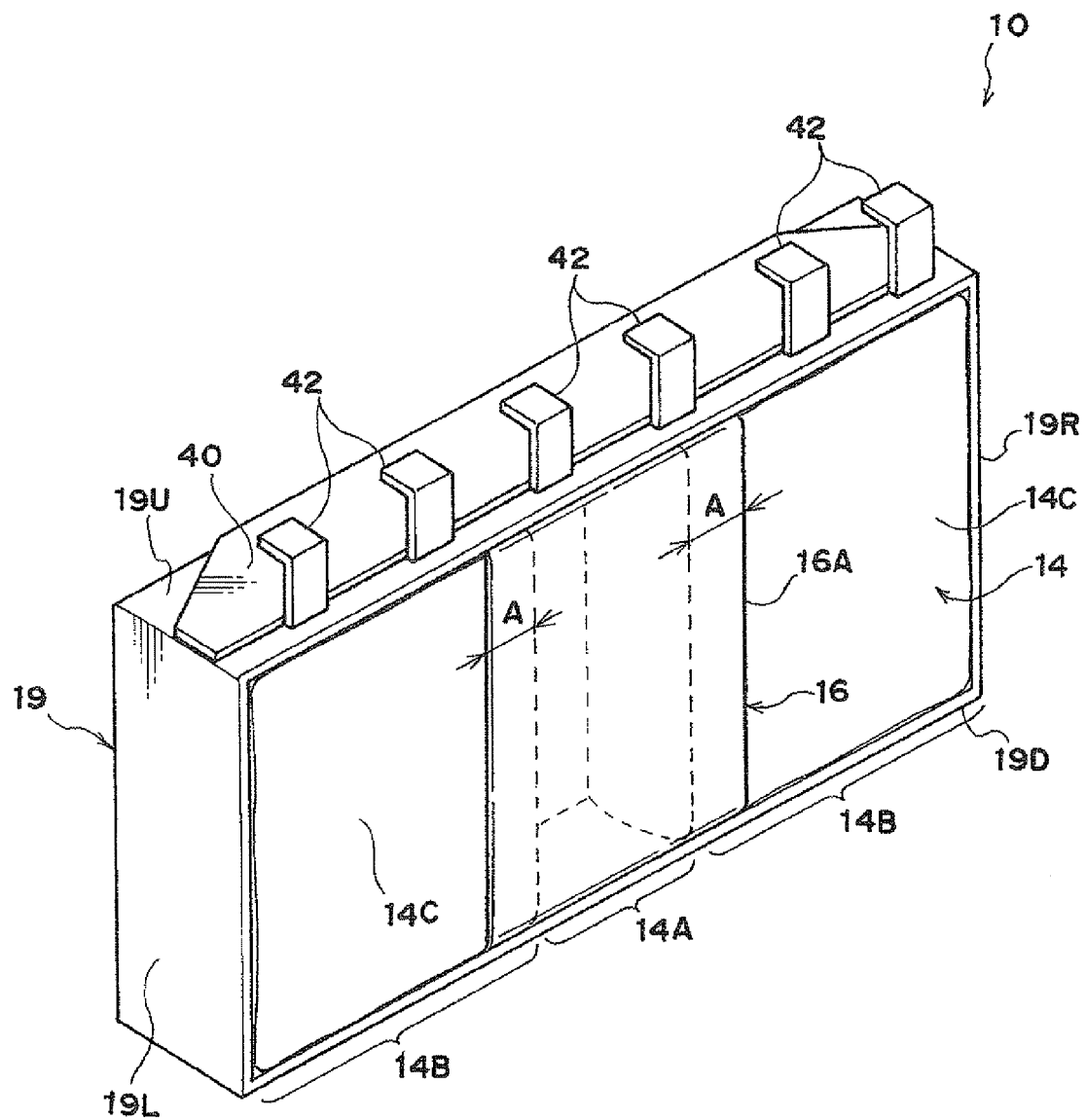
Figure 5:
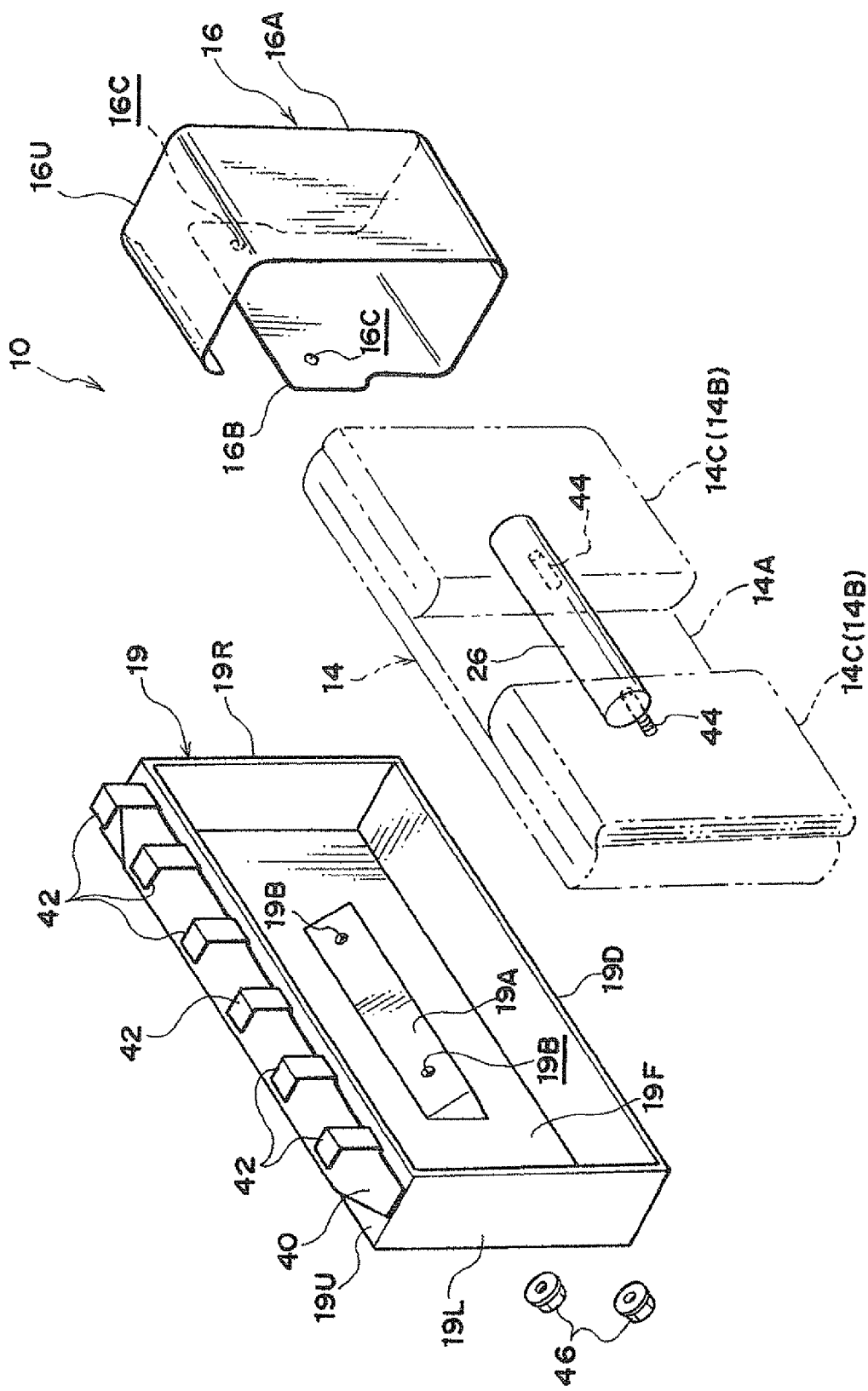

In FIG. 2 and FIG. 3, module case 19 (a housing), in which knee airbag 14 is stored in a folded state, is provided inside glove box door 24. As shown in FIG. 4 and FIG. 5, module case 19 is a metallic casing including a rectangular bottom portion 19F positioned at the vehicle front side. And module case 19 includes a vehicle upper-side vertical wall portion 19U, a vehicle lower-side vertical wall portion 19D, a vehicle right-side vertical wall portion 19R and a vehicle left-side vertical wall portion 19L, respectively provided upright from the four sides of bottom portion 19F towards the vehicle rear side. When glove box door 24 is closed (see FIG. 2 and FIG. 3) module case 19 is disposed so that the vehicle rear side is the opening side. For example, a metallic plate 40 is respectively fixed at the upper surface of vehicle upper-side vertical wall portion 19U and at the lower surface of vehicle lower-side vertical wall portion 19D of module case 19 respectively. Several hooks 42 are respectively provided in series in the vehicle width direction at metallic plates 40.

Further, as shown in FIG. 2, FIG. 3 and FIG. 5, a mounting portion 19A for an inflator 26 is provided at bottom portion 19F of module case 19. At inflator 26, for example, two stud bolts 44 are provided upright, stud bolts 44 are inserted from the vehicle rear side into mounting portion 19A of module case 19, and inflator 26 is fixed together with knee airbag 14 to module case 19 by nuts 46 fastening stud bolts 44 from the vehicle front side direction. As shown in FIG. 2 and FIG. 3, mounting portion 19A of module case 19 is configured as an inclined surface separated from inner panel 38 of glove box door 24 in order to ensure that there is space for mounting nuts 46. Further, as shown in FIG. 5, at mounting portion 19A of module case 19, through-holes 19B are provided at two locations in order to let stud bolts 44 pass therethrough.

As shown in FIG. 2 and FIG. 3, a retainer 48 is mounted at the outer panel 36 side inside glove box door 24. Retainer 48, for example, is fixed at the inner surface (the surface in the vehicle front side direction) of outer panel 36 at peripheral base portion 48A. At base portion 48A, vertical wall portions 48B are provided upright towards inner panel 38 in a frame shape so as to enclose the mounted region of module case 19.

At upper and lower vertical wall portions 48B of retainer 48, several engagement holes 48E are formed in a series along the vehicle width direction respectively, and the engagement holes 48E respectively engage hooks 42 of module case 19.

It should be noted that between upper and lower vertical wall portions 48B of retainer 48, a pair of upper and lower door base materials (not shown) may be provided at the back surface of outer panel 36. In this case, a designated rupture portion (not shown) which is ruptureable under expansion pressure, of a predetermined level or greater, of knee airbag 14, is formed between the pair of upper and lower base materials, and at the base of upper and lower vertical wall portions 48B, hinge portions (not shown) extending in the vehicle width direction are formed respectively.

Next, in FIGS. 1 to 5, flap 16, which is one example of a deployment control cloth, including a general portion 16A configured to be narrower in the vehicle width direction than knee airbag 14 in a folded state, is disposed so as to extend over central region 14A of knee bag 14 in the vehicle vertical direction from the vehicle rear side. At the time of initial expansion and deployment of knee airbag 14, flap 16 suppresses expansion and deployment of central region 14A and initializes expansion and deployment of end portion regions 14B towards the outer sides in the vehicle width direction before expansion and deployment of central region 14A.

Specifically, flap 16 is, for example, a non-stretchable cloth, and, for example, an end portion 16B at the vehicle lower side (one end portion in the vehicle vertical direction) is held in place between knee airbag 14 and bottom portion 19F of module case 19. As shown in FIG. 5, through-holes 16C, corresponding to through-holes 19B of module case 19, are provided at end portion 16B at the vehicle lower side. It should be noted that end portion 16B at the vehicle lower side is an end portion positioned at the vehicle lower side when flap 16, according to general portion 16A, is in a state of having been deployed in the vehicle vertical direction.

As shown in FIG. 3, general portion 16A of flap 16 from the lower end of end portion 16B which is held in place between knee airbag 14 and bottom portion 19F of module case 19 and passing between knee airbag 14 and vertical wall portion 19D at the vehicle lower side of module case 19, extends over central region 14A of knee airbag 14 (FIG. 4) from the vehicle lower side to the vehicle upper side.

As shown in FIG. 4, in the present embodiment, general portion 16A of flap 16 is disposed so as to cover a part of folded portions 14C in the vehicle width direction of knee airbag 14 from the vehicle rear side. In other words, general portion 16A of flap 16 does not only cover central region 14A of knee airbag 14, but also covers a part of end portion regions 14B. An amount of overlap A of general portion 16A and folded portions 14C in the vehicle width direction is configured in consideration of balance between retention of folded portions 14C by flap 16 when not deployed, and the ability to deploy folded portions 14C at the time of initial expansion and deployment of knee airbag 14. It should be noted that a configuration in which general portion 16A of flap 16 does not cover a part of folded portions 14C (end portion regions 14B) of knee airbag 14 may also be adopted.

Further, as shown in FIG. 11, in the vehicle width direction, a width dimension F of general portion 16A of flap 16 is configured to be one third or less of a width dimension W of knee airbag 14 in a folded state; that is, W/3 or less. This is in order to expand and deploy end portion regions 14B over a wider range at the time of initial expansion and deployment of knee airbag 14.

In FIG. 11, F=W/3 is shown as an example. In this example, since general portion 16A of flap 16 is provided at the central portion of knee airbag 14 in the vehicle width direction, the width of regions of knee airbag 14 which general portion 16A of flap 16 does not extend over are also W/3 respectively. In a case of disposing general portion 16A so as to only extend over central region 14A of knee airbag 14, width dimension F of general portion 16A, the width dimension of central region 14A and the width dimension of end portion regions 14B of knee airbag 14, in the vehicle width direction, are all W/3.

Next, as shown in FIG. 3, an end portion 16U (the other end portion in the vehicle vertical direction) at the vehicle upper side of flap 16 continuing from general portion 16A, is disposed at least between knee airbag 14 and vertical wall portion 19U at the vehicle upper side of module case 19, and at the time of initial expansion and deployment of knee airbag 14, end portion 16U is fixed and held between knee airbag 14 and vertical wall portion 19U at the vehicle upper side due to expansion pressure. Here, vertical wall portion 19U at the vehicle upper side is disposed at the opposite side in the vehicle vertical direction with respect to end portion 16D at the vehicle lower side of flap 16 which is held in place between knee airbag 14 and bottom portion 19F of module case 19. It should be noted that end portion 16U at the vehicle upper side is an end portion positioned at the vehicle upper side when flap 16, according to general portion 16A, is in a state of having been deployed in the vehicle vertical direction.

It should be noted that the size and shape of end portion 16U at the vehicle upper side, disposed between knee airbag 14 and vertical wall portion 19U at the vehicle upper side of module case 19, are not limited to what is shown in the drawings. When it is desired to increase the expansion and deployment suppressing effect of central region 14A at the time of initial expansion and deployment of the knee airbag 14, and to delay the timing of end portion 16U at the vehicle upper side of flap 16 breaking away from between knee airbag 14 and vertical wall portion 19U at the vehicle upper side and knee airbag 14 fully deploying, a surface area of end portion 16U at the vehicle upper side may be enlarged. This is because, a fitting and holding force of end portion 16U at the vehicle upper side between module case 19 and knee airbag 14 can be increased at the time of initial expansion and deployment of knee airbag 14. Specifically, end portion 16U at the vehicle upper side may be extended from between knee airbag 14 and vertical wall portion 19U at the vehicle upper side of module case 19 to between knee airbag 14 and bottom portion 19F of module case 19.

On the other hand, when it is desired to decrease the expansion and deployment suppressing effect of central region 14A at the time of initial expansion and deployment of the knee airbag 14, and to accelerate the timing of end portion 16U at the vehicle upper side of flap 16 breaking away from between knee airbag 14 and vertical wall portion 19U at the vehicle upper side and knee airbag 14 fully deploying, the surface area of end portion 16U at the vehicle upper side may be reduced. This is because, at the time of initial expansion and deployment of knee airbag 14, the fitting and holding force of end portion 16U at the vehicle upper side between module case 19 and knee airbag 14 can be diminished.

In the example shown in the drawings, a vehicle width direction dimension from general portion 16A to end portion 16U at the vehicle upper side is uniform; however, the present invention is not limited to this and, for example, the edges of general portion 16A in the vehicle width direction may be a curved shape or a liner bent shape, and end portion 16U at the vehicle upper side may be enlarged or reduced in the vehicle width direction.

(Operation)

The present embodiment is configured as described above and the operation thereof is explained below. In FIG. 1, in knee airbag device 10 for a front passenger seat according to the present embodiment, when vehicle 18 has a frontal collision and an airbag ECU determines that a frontal collision has occurred based on a signal from a collision sensor (not shown) an operating current is passed from the airbag ECU to inflator 26 (FIG. 2). Inflator 26 receives the operating current and activates, and ejects a large quantity of gas. By this gas being supplied to knee airbag 14 which is stored in module case 19 at the inside of glove box door 24 in a folded state, expansion and deployment of knee airbag 14 begins.

Figure 6:
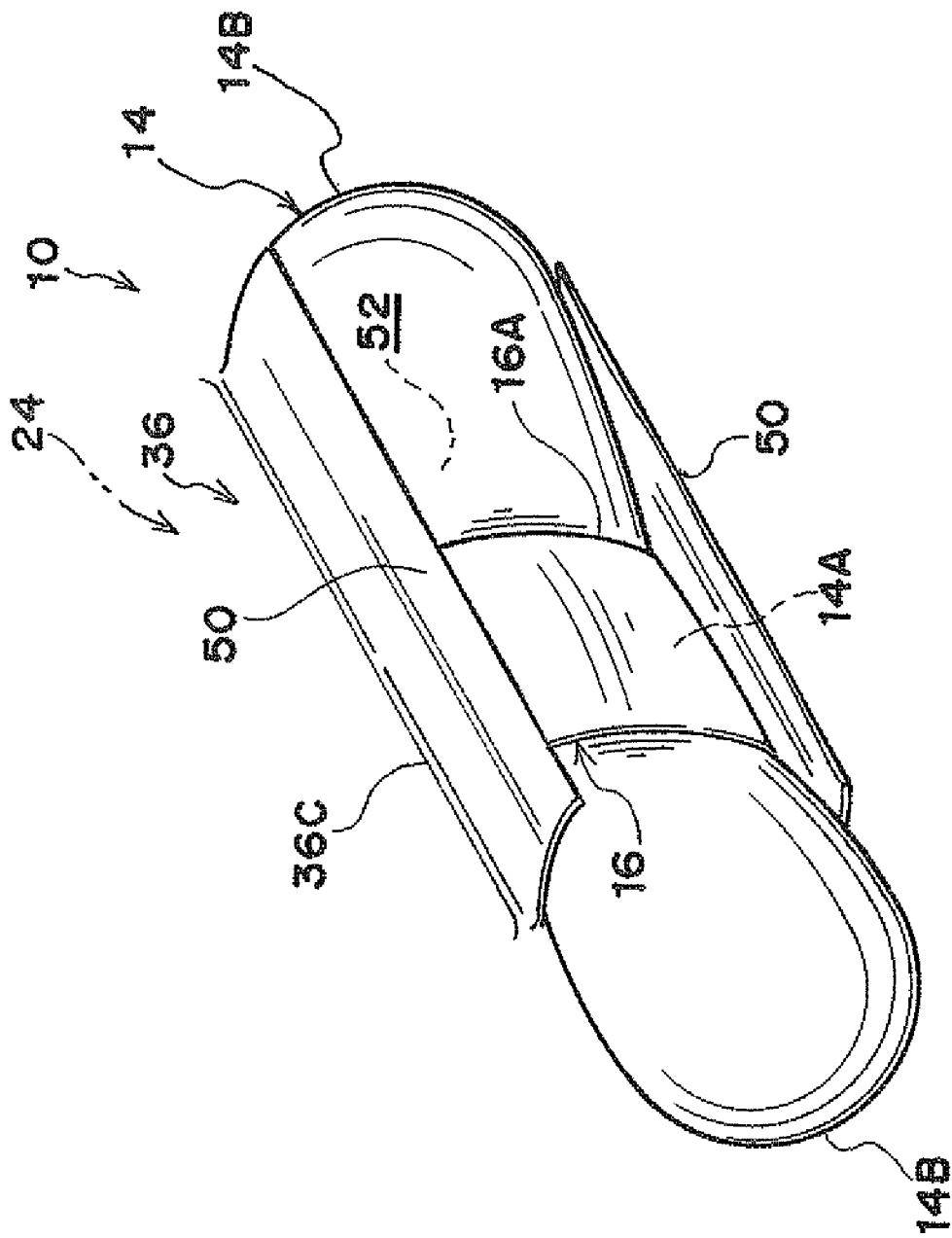
Figure 9:
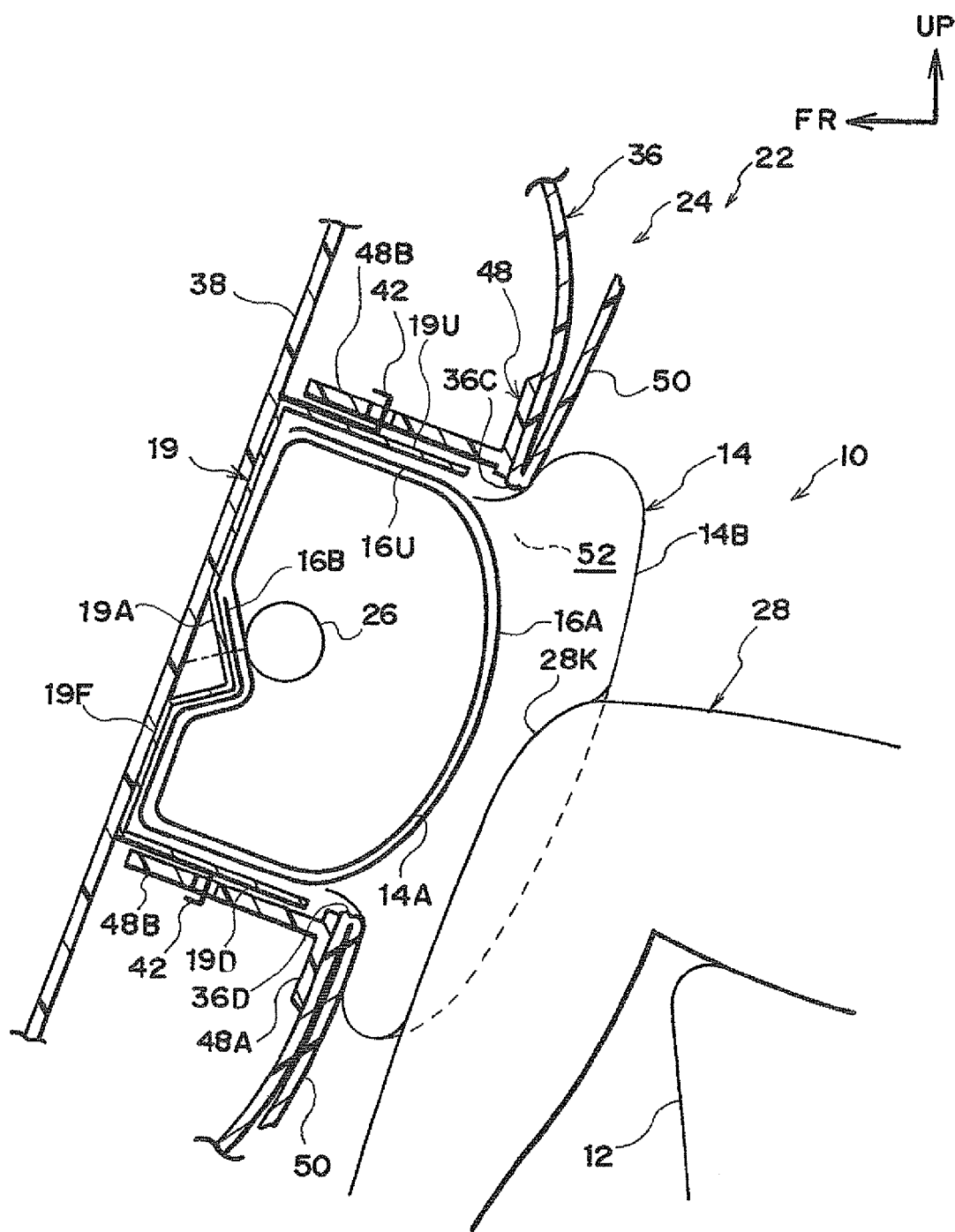

Expansion pressure of knee airbag 14 at this time acts on the back surface (the surface at the front side of the vehicle) of outer panel 36 of glove box door 24. When this expansion pressure becomes equal to or greater than a predetermined amount, horizontal designated rupture portion 36A and vertical designated rupture portions 36B, provided at outer panel 36, rupture. As a result, as shown in FIG. 6 and FIG. 9, a part of outer panel 36 becomes an airbag door 50 which deploys towards both sides of the vehicle upper side and the vehicle lower side about hinge portions 36C and 36D (FIG. 3), thereby forming an opening portion 52. Knee airbag 14 bulges through this opening portion 52 from inside glove box door 24 to the side of knee regions 28K of occupant 28 (FIG. 9 and FIG. 11).

Figure 7:
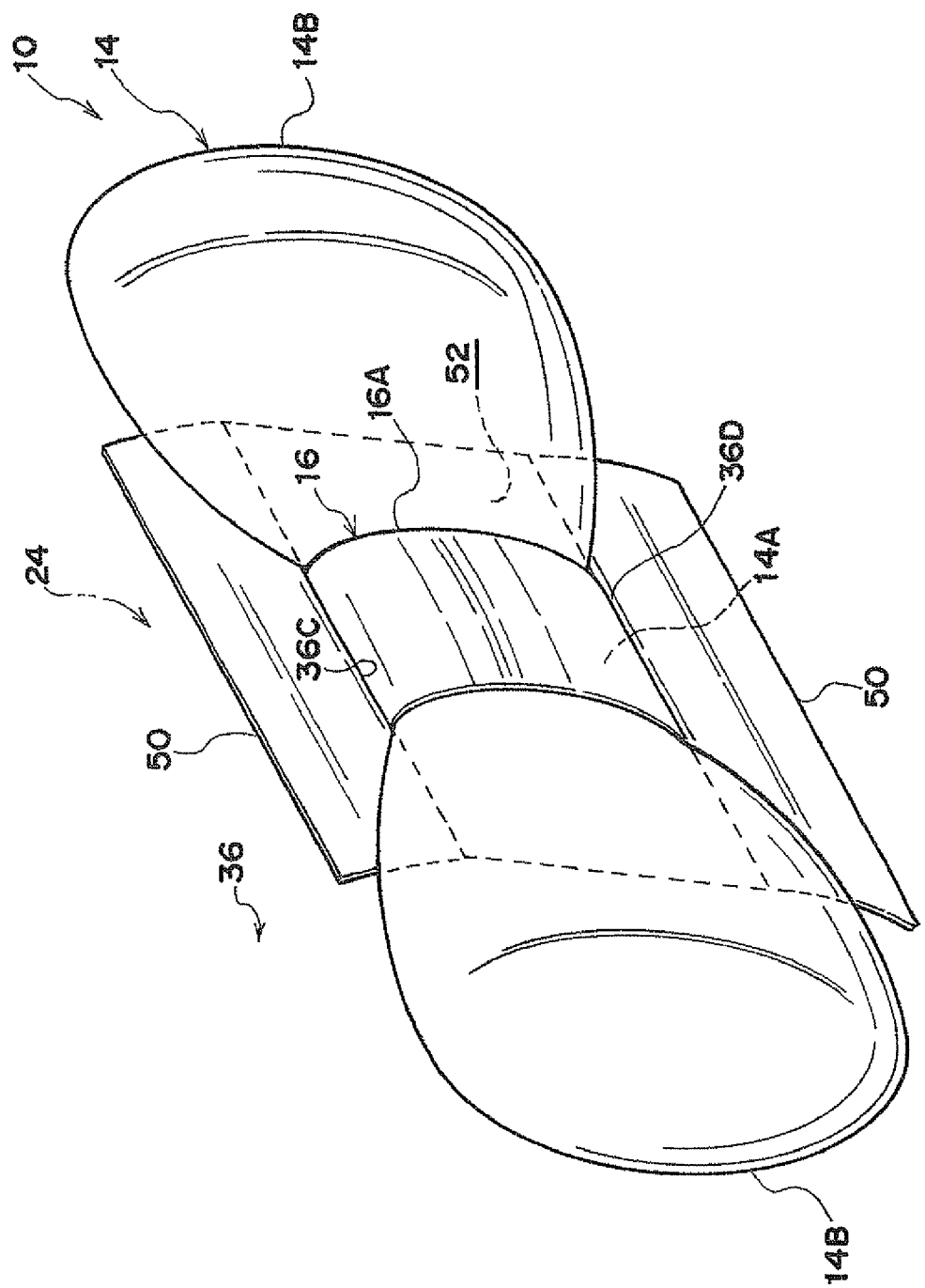

At this time, as shown in FIG. 6, FIG. 7 and FIG. 9, expansion and deployment of central region 14A of knee airbag 14 is suppressed by general portion 16A of flap 16, and end portion regions 14B of knee airbag 14 expand and deploy before central region 14A. Specifically, because end portion 16B at the vehicle lower side of flap 16 is held in place between knee airbag 14 and bottom portion 19F of module case 19, and end portion 16U at the vehicle upper side of flap 16 is disposed between knee airbag 14 and vertical wall portion 19U at the vehicle upper side of module case 19, at the time of initial expansion and deployment of knee airbag 14, end portion 16U at the vehicle upper side of flap 16 is fixed and held between knee airbag 14 and vertical wall portion 19U at the vehicle upper side of module case 19 due to expansion pressure of knee airbag 14.

As a result, since a friction force occurs between vertical wall portion 19U at the vehicle upper side, end portion 16U at the vehicle upper side and knee airbag 14, a tensile force occurs at general portion 16A of flap 16 due to expansion pressure of knee airbag 14. As a result, at the time of initial expansion and deployment of knee airbag 14, expansion and deployment of central portion 14A of knee airbag 14 is suppressed by general portion 16A of flap 16, and end portion regions 14B positioned at either side in the vehicle width direction of central region 14A and at the vehicle front of knee regions 28K of occupant 28 expand and deploy before central region 14A.

Here, at the time of a frontal collision of vehicle 18, when knee regions 28K of occupant 28 are in a state of being close to glove box door 24 (the housing of knee airbag 14), as shown in FIG. 11, since end portion regions 14B of either side of knee airbag 14 respectively expand and deploy from between knee regions 28K of occupant 28 and outer panel 36 of glove box door 24 towards the outer sides of knee regions 28K, a reaction force of knee airbag 14 with respect to knee regions 28K is weakened. Consequently, at the time of a frontal collision of vehicle 18, even in a case in which knee regions 28K of occupant 28 are in a state of being close to glove box door 24 (the housing of knee airbag 14), knee regions 28K can be appropriately restrained by knee airbag 14.

It should be noted that a "state of being close to" means that the clearance between glove box door 24, having module case 19 provided therein as the housing of knee airbag 14, and knee regions 28K of occupant 28 is smaller than the thickness of knee airbag 14 at the time of completion of expansion and deployment. In other words, a "state of being close to" means that knee regions 28K of occupant 28 are at a position where knee regions 28K of occupant 28 contact knee airbag 14 before knee airbag 14 completely expands and deploys to its full size.

Figure 8:
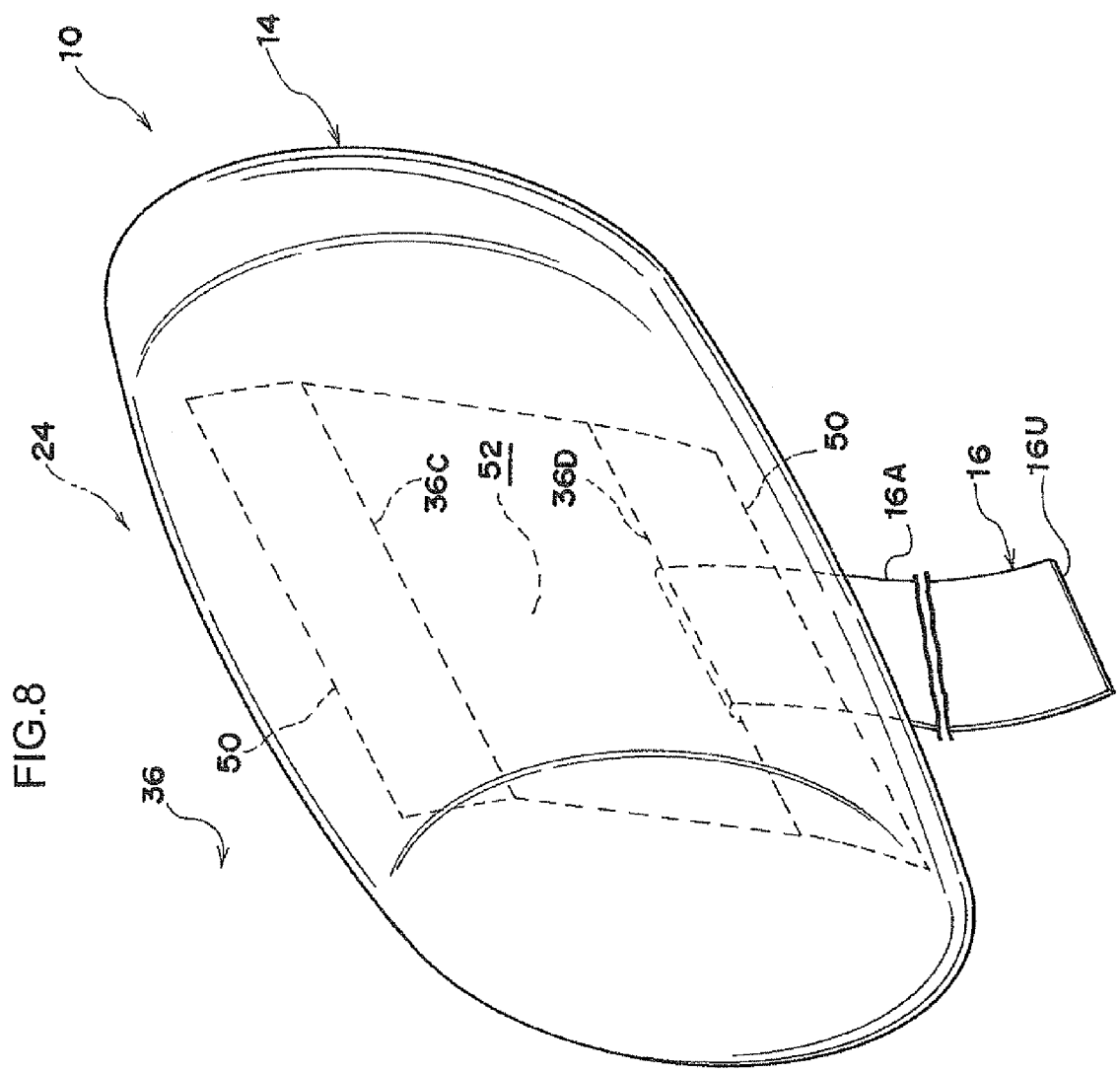
Figure 10:
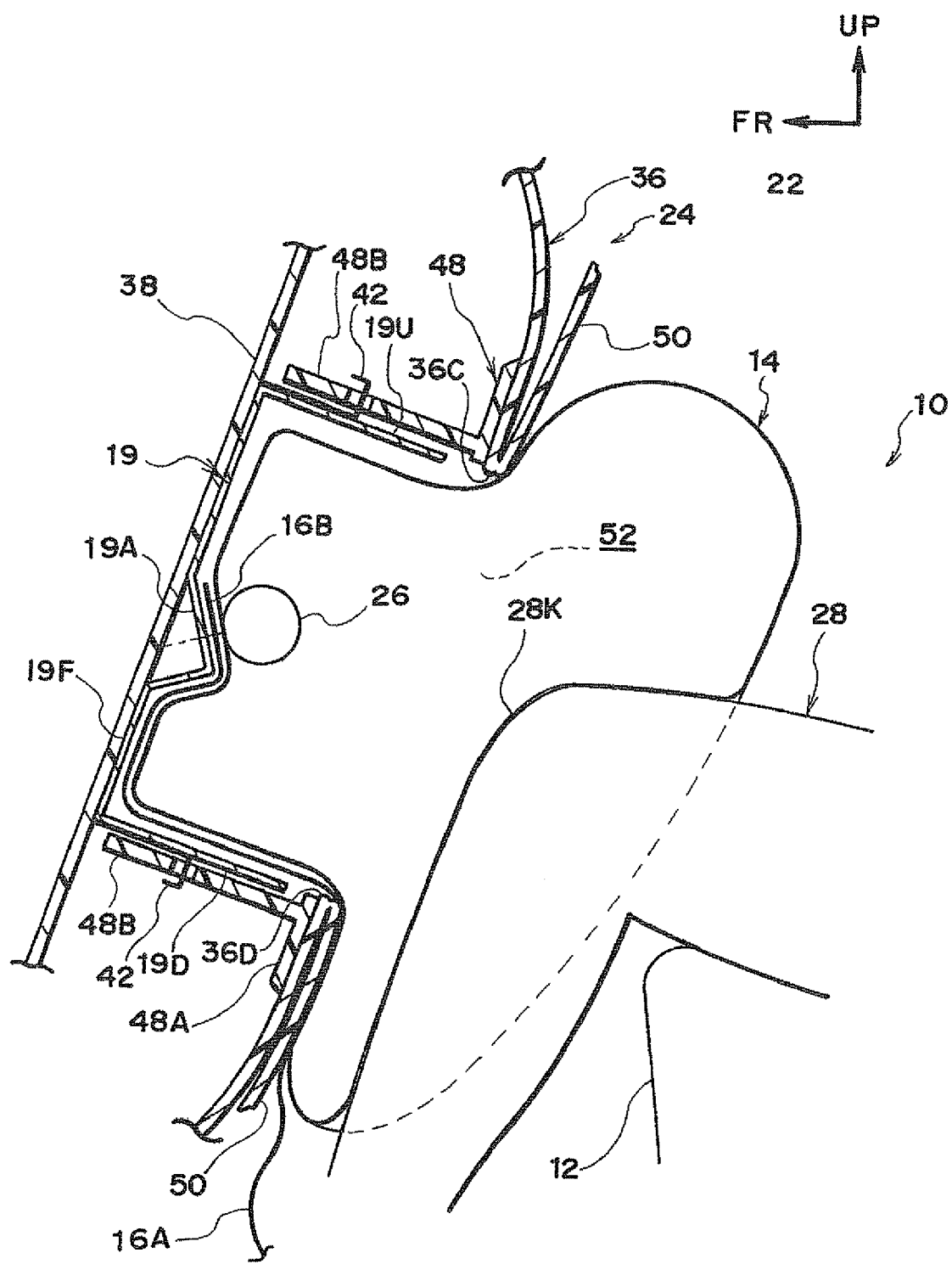

As shown in FIG. 8 and FIG. 10, expansion and deployment of knee airbag 14 further progresses, a tensile force that occurs at general portion 16A of flap 16 further increases, and when the tensile force exceeds the friction force between vertical wall portion 19U at the vehicle upper side of module case 19, end portion 16U at the vehicle upper side of flap 16 and knee airbag 14, end portion 16U at the vehicle upper side of flap 16 breaks away from between knee airbag 14 and vertical wall portion 19U at the vehicle upper side. As a result, since suppression of expansion and deployment of central region 14A of knee airbag 14 is released, central region 14A expands and deploys from the vehicle upper side towards the vehicle lower side and knee airbag 14 can be expanded and deployed to its full size (full deployment). Consequently, at the time of a frontal collision of vehicle 18, when knee regions 28K of occupant 28 in front passenger seat 12 are well separated from glove box door 24 and are not in a state of being close to glove box door 24, a reaction force of knee airbag 14 with respect to knee regions 14 is sufficiently established and knee regions 28K can be appropriately restrained.

It should be noted that as shown in FIG. 4, when not deployed, after being folded in the vehicle vertical direction, knee airbag 14 is folded from both sides in the vehicle width direction towards the center in the vehicle width direction and folded portions 14C in the vehicle width direction are disposed at end portion regions 14B, and since general portion 16A of flap 16 is disposed so as to cover, in the vehicle width direction, a part of folded portions 14C disposed at end portion regions 14B of knee airbag 14, from the vehicle rear side, folded portions 14C in the vehicle width direction can be stably held by general portion 16A of flap 16 when not deployed.

At the time of expansion and deployment of knee airbag 14, folded portions 14C in the vehicle width direction break away from general portion 16A of flap 16 and end portion regions 14B can rapidly expand and deploy to the vehicle front of knee regions 28K of occupant 28. Consequently, while a folded state of knee airbag 14 is stabilized when not deployed, knee regions 28K of occupant 28 can be appropriately restrained with knee airbag 14 at the time of a frontal collision of vehicle 18.

Further, as shown in FIG. 11, in knee airbag device 10 for a front passenger seat according to the present embodiment, since width dimension F of general portion 16A of flap 16 is configured to be one third or less of width dimension W of knee airbag 14 in a folded state, that is, W/3 or less, end portion regions 14B can be expanded and deployed over a wider range at the time of initial expansion and deployment of knee airbag 14. For this reason, at the time of a frontal collision of vehicle 18, even when knee regions 28K of occupant 28 of front passenger seat 12 are in a state of being close to glove box door 24, and a center position Cb of knee airbag 14 and a center position Cp between both of knee regions 28K of occupant 28 are offset (an offset amount e) in the vehicle width direction, end portion regions 14B of knee airbag 14 are respectively expanded and deployed between knee regions 28K and glove box door 24, and knee regions 28K can be appropriately restrained.

Further, in knee airbag device 10 for a front passenger seat according to the present embodiment, since module case 19 which is the housing for knee airbag 14 is provided inside glove box door 24 which constitutes the occupant side exterior wall of glove box 22 of vehicle 18, knee airbag 14 can be rapidly deployed between knee regions 28K of occupant 28 of front passenger seat 12 and glove box door 24 at the time of a frontal collision of a vehicle. For this reason, restrainability of knee regions 28K of occupant 28 of front passenger seat 12 can be enhanced.

It should be noted that, in the present embodiment, end portion 16B at the vehicle lower side of flap 16 is held in place between knee airbag 14 and bottom portion 19F of module case 19, and end portion 16U at the vehicle upper side is disposed at least between knee airbag 14 and vertical wall portion 19U at the vehicle upper side of module case 19; however, the present invention is not limited to this, and the mounting structure of end portion 16U at the vehicle upper side of flap 16 and end portion 16B at the vehicle lower side may be vertically inverted. Specifically, end portion 16U at the vehicle upper side of flap 16 may be held in place between knee airbag 14 and bottom portion 19F of module case 19, and end portion 16B at the vehicle lower side may be disposed at least between knee airbag 14 and vertical wall portion 19D at the vehicle lower side of module case 19.

Second Embodiment

Figure 12:
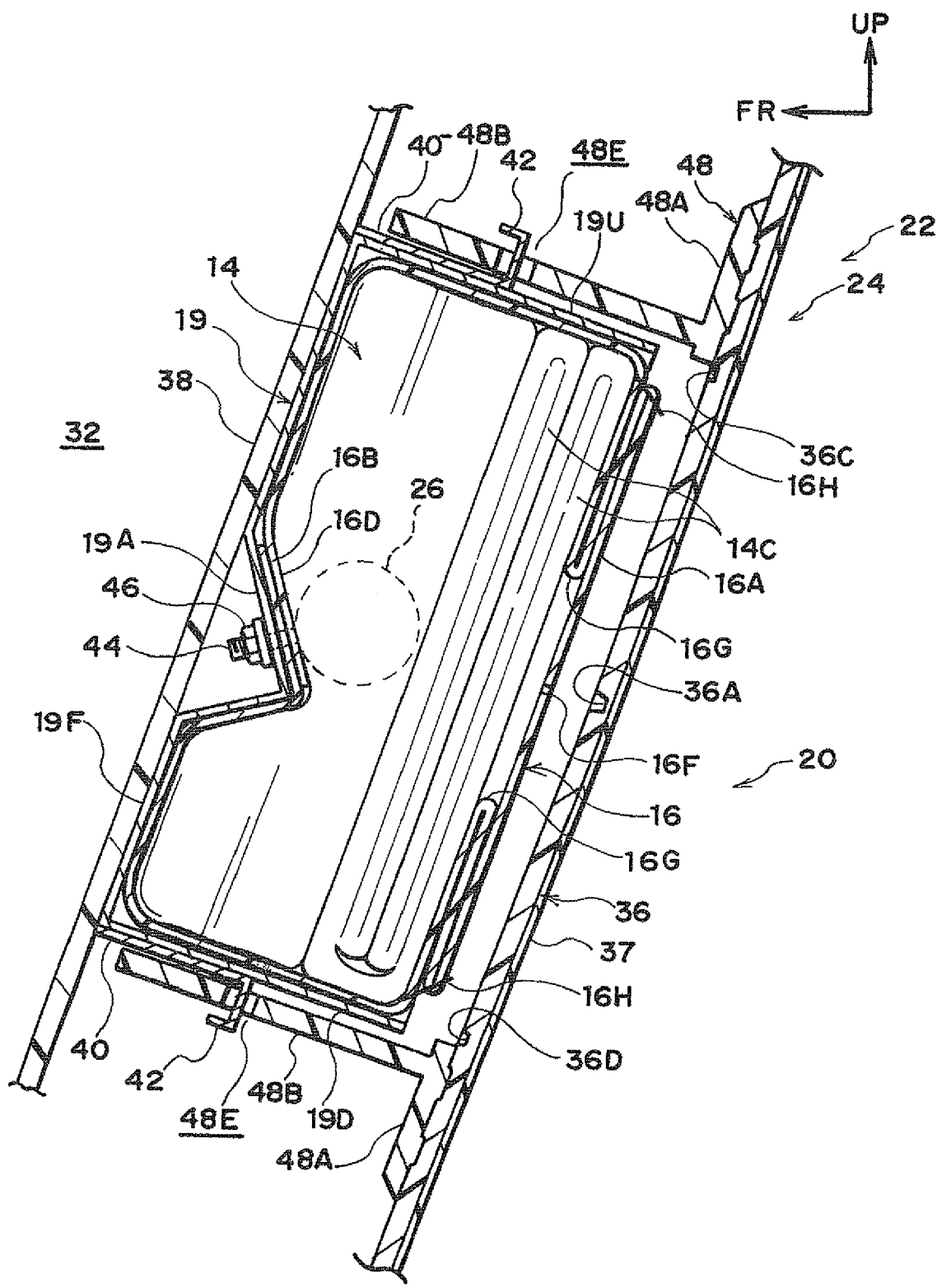
FIG. 12 to FIG. 18 relate to the second embodiment and FIG. 12 is a section diagram, corresponding to FIG. 3, showing a knee airbag device for a front passenger seat provided at the inside of a glove box door.
Figure 14:
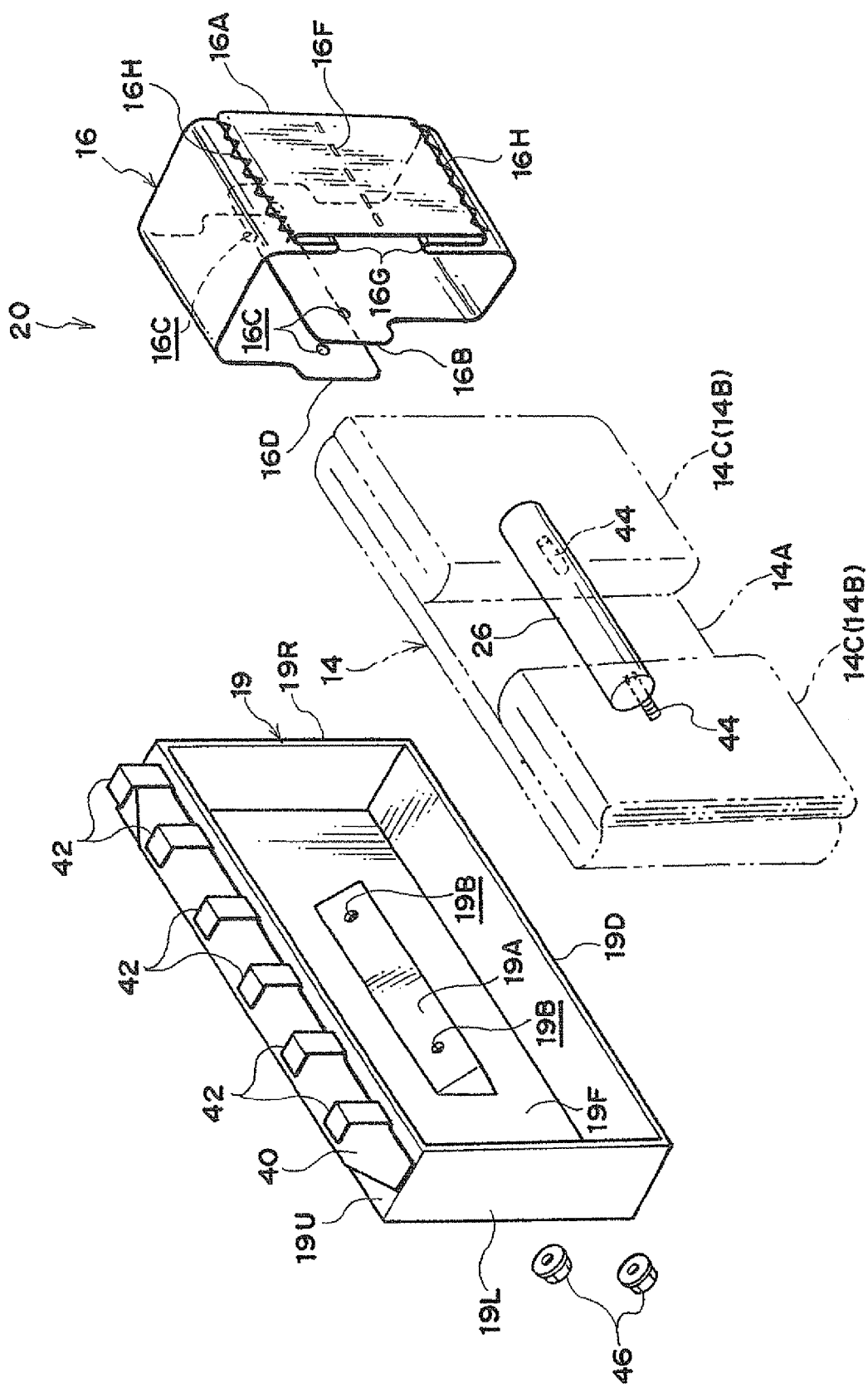

In FIG. 12, in a knee airbag device 20 for a front passenger seat according to the present embodiment, end portion 16D at the vehicle upper side of flap 16 and end portion 16B at the vehicle lower side of flap 16 are respectively held in place between, for example, knee airbag 14 and bottom portion 19F of module case 19. As shown in FIG. 14, through-holes 16C, corresponding to through-holes 19B of mounting portion 19A of module case 19, are respectively provided at end portion 16D at the vehicle upper side and end portion 16B at the vehicle lower side. For example, end portion 16D at the vehicle upper side and end portion 16B at the vehicle lower side are held in place between knee airbag 14 and bottom portion 19F of module case 19 in a state in which end portion 16D at the vehicle upper side is laid over on the vehicle rear side of end portion 16B at the vehicle lower side, and locations of respective through-holes 16C are matched.

Specifically, when housing knee airbag 14 in module case 19, stud bolts 44 of inflator 26 pass through through-holes 16C. These stud bolts 44 are further inserted through through-holes 19B of mounting portion 19A at module case 19. In this state, stud bolts 44 protrude out towards the vehicle front side of mounting portion 19A. As a result of tightening nuts 46 and stud bolts 44, inflator 26, knee airbag 14 and flap 16 are fastened and fixed to mounting portion 19A of module case 19.

Figure 13:
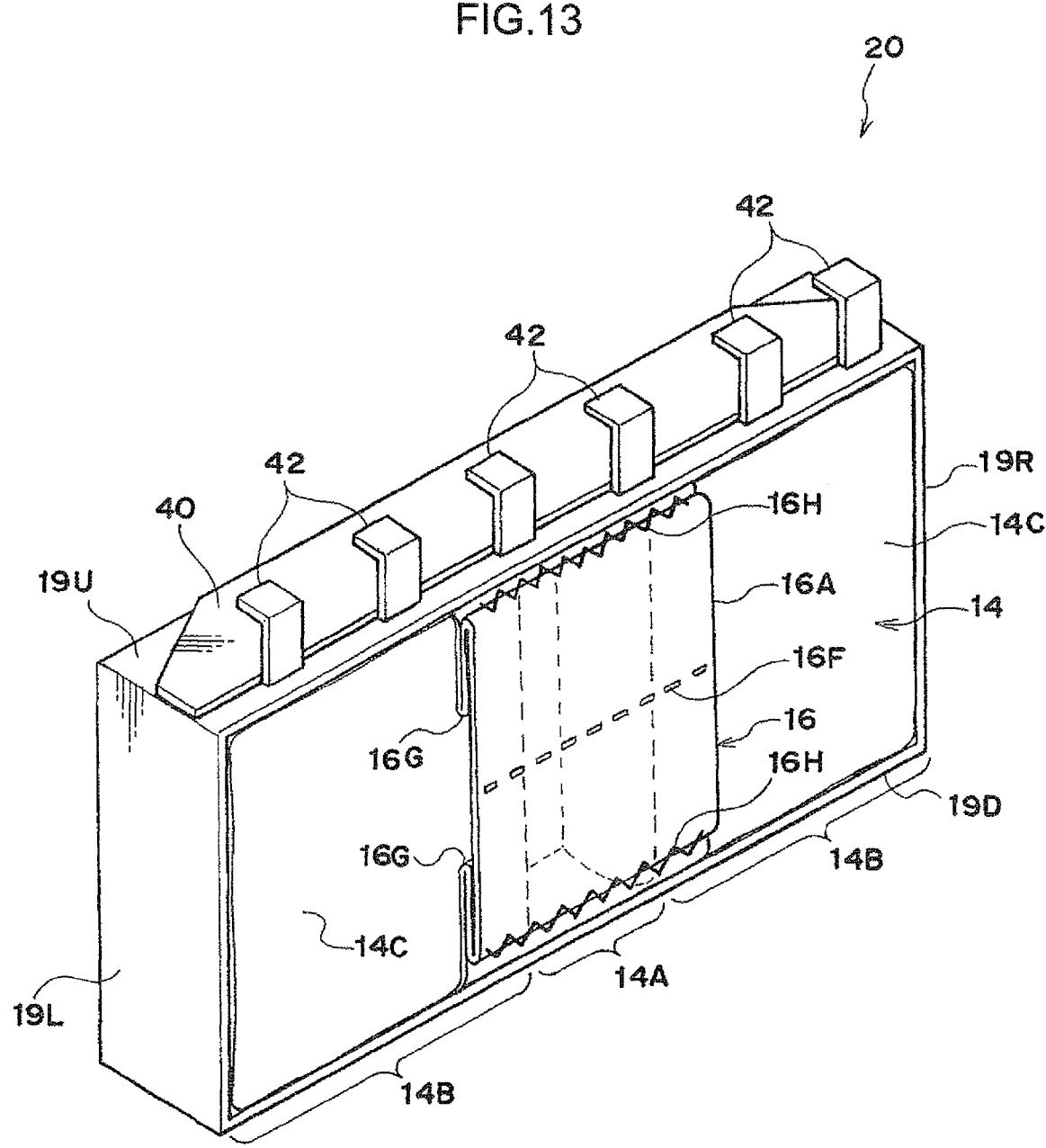

As shown in FIGS. 12 to 14, designated rupture portion 16F of flap 16, which ruptures when a tensile force which is equal to or greater than a predetermined amount occurs at general portion 16A, is provided, for example, at a central region in the vehicle vertical direction of general portion 16A which extends over central region 14A of knee bag 14. This designated rupture portion 16F is a perforation or a slit or the like. The strength of designated rupture portion 16F is configured in consideration of the timing of the release of suppression of deployment of central region 14A of knee airbag 14 by flap 16 at the time of initial expansion and deployment of knee airbag 14.

Further, surplus length portions 16G, having a length corresponding to a permissible bulge amount of central region 14A towards the occupant 28 side (see FIG. 17) at the time of initial expansion and deployment of knee airbag 14, are provided at general portion 16A of flap 16. These surplus length portions 16G are folded in on themselves at the vehicle rear side of central region 14A of knee airbag 14 when not deployed, and are sewn at controlled sewn portions 16H which are breakable under a tensile force which occurs at flap 16 at the time of expansion and deployment of knee airbag 14. In the present embodiment, surplus length portions 16G are equally provided at the vehicle upper side and the vehicle lower side of general portion 16A respectively.

One of controlled sewn portions 16H is provided, for example, at one position at each of surplus length portions 16G. The strength of controlled sewn portions 16H with respect to a tensile force which occurs at general portion 16A of flap 16 is configured to be less than the strength of designated rupture portion 16F. As a result, at the time of initial expansion and deployment of knee airbag 14, first, at a stage in which a comparatively small tensile force occurs at general portion 16A of flap 16, controlled sewn portions 16H break and surplus length portions 16G extend in conjunction with a bulge of central region 14A of knee airbag 14 towards the side of knee regions 28K of occupant 28, and when a tensile force equal to or greater than a predetermined amount occurs at general portion 16A, designated rupture portion 16F ruptures.

It should be noted that the way of folding or the position of folding surplus length portions 16G, and the position of controlled sewn portions 16H or the length of perforation is not limited to the example shown in the drawings.

Regarding other portions, since these are similar to the first embodiment, the same portions have been given the same reference numbers in the drawings, and explanation thereof is omitted.

(Operation)

Figure 17:
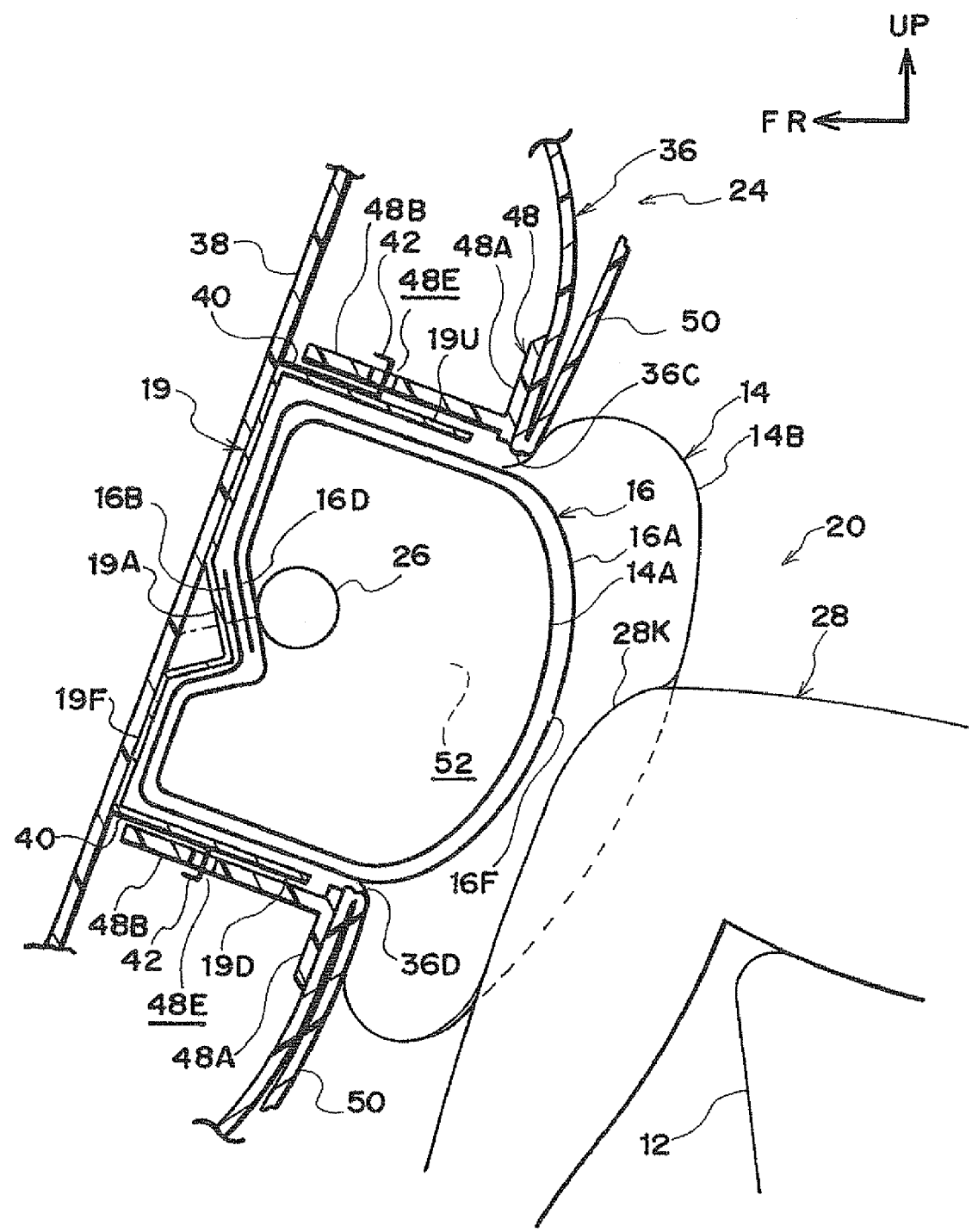

The present embodiment is configured as described above and the operation thereof is explained below. In FIG. 12, in knee airbag device 20 for a front passenger seat according to the present embodiment, at the time of a frontal collision of vehicle 18 (refer to FIG. 1), similar to the first embodiment, opening portion 52 is formed at outer panel 36 of glove box door 24 due to expansion pressure of knee airbag 14, and knee airbag 14 bulges through opening portion 52 from inside glove box door 24 to the side of knee regions 28K of occupant 28 (FIG. 17 and FIG. 18).

Figure 15:
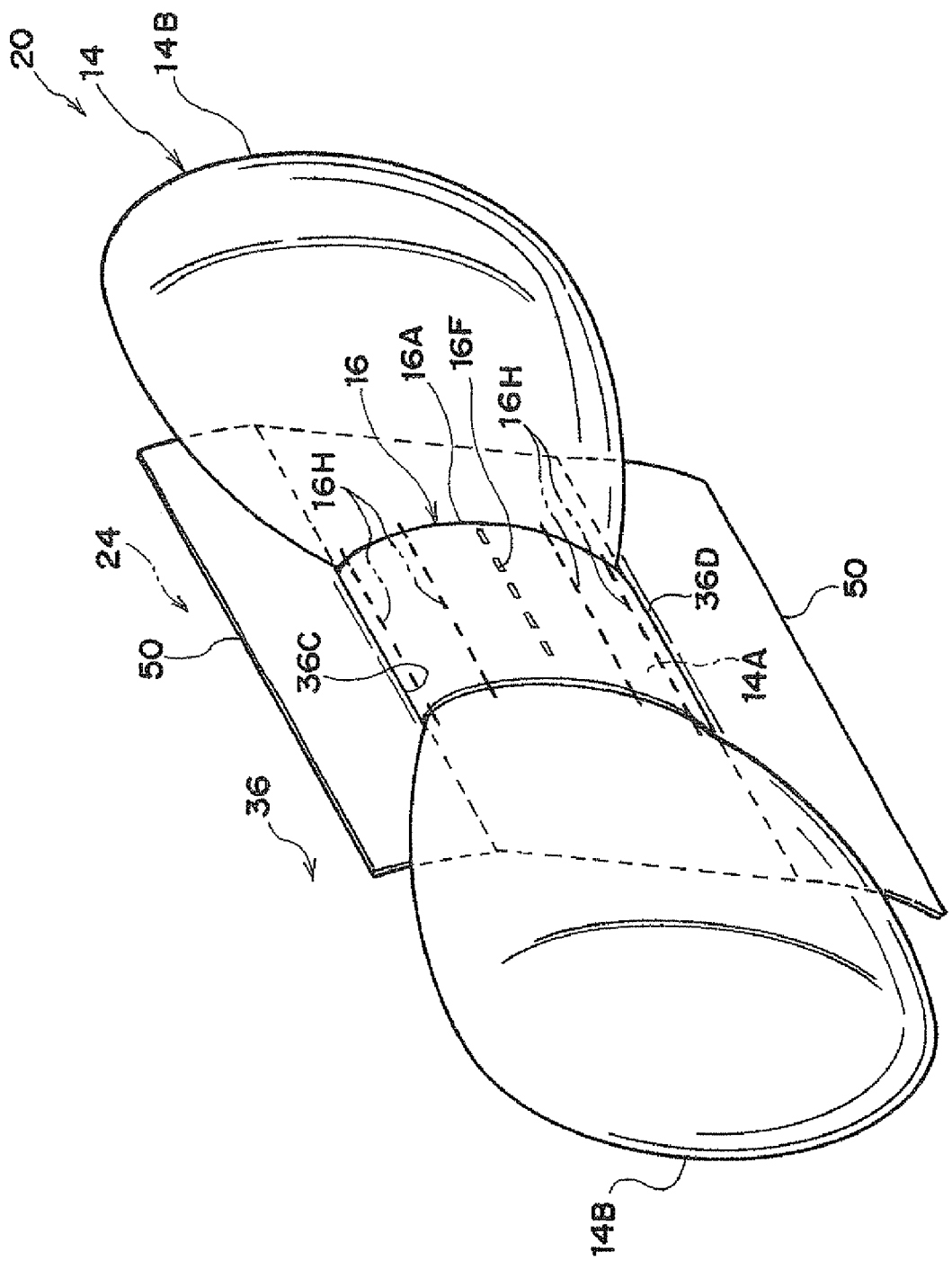

At this time, as shown in FIG. 15, controlled sewn portions 16H, which sew surplus length portions 16G in a folded state, break due to a tensile force which occurs at general portion 16A of flap 16. As a result thereof, folded surplus length portions 160 rapidly extend in conjunction with expansion and deployment of central region 14A of knee airbag 14. Central region 14A of knee airbag 14 can rapidly bulge towards the side of knee regions 28K of occupant 28 (FIG. 17) until surplus length portions 16G completely extend. When surplus length portions 16G completely extend, a tensile force occurs at flap 16 and expansion and deployment of central region 14A of knee airbag 14 is suppressed. Consequently, while stabilizing the state of surplus length portions 16G when not deployed, after central region 14A of knee airbag 14 is made to rapidly bulge towards the side of knee regions 28K of occupant 28, expansion and deployment of central region 14A can be suppressed at the time of initial expansion and deployment of knee airbag 14.

Further, at this time, since end portion 16D at the vehicle upper side of flap 16 and end portion 16B at the vehicle lower side of flap 16 are respectively held in place between knee airbag 14 and bottom portion 19F of module case 19, expansion and deployment of central region 14A of knee airbag 14 can be stably suppressed by flap 16. Since expansion and deployment of end portion regions 14B of knee airbag 14 precedes expansion and deployment of central region 14A, at the time of a frontal collision of vehicle 18, even in a case in which knee regions 28K of occupant 28 in front passenger seat 12 are in a state of being close to glove box door 24, a reaction force of knee airbag 14 with respect to knee regions 28K of occupant 28 is suppressed, and knee regions 28K can be appropriately restrained.

Figure 16:
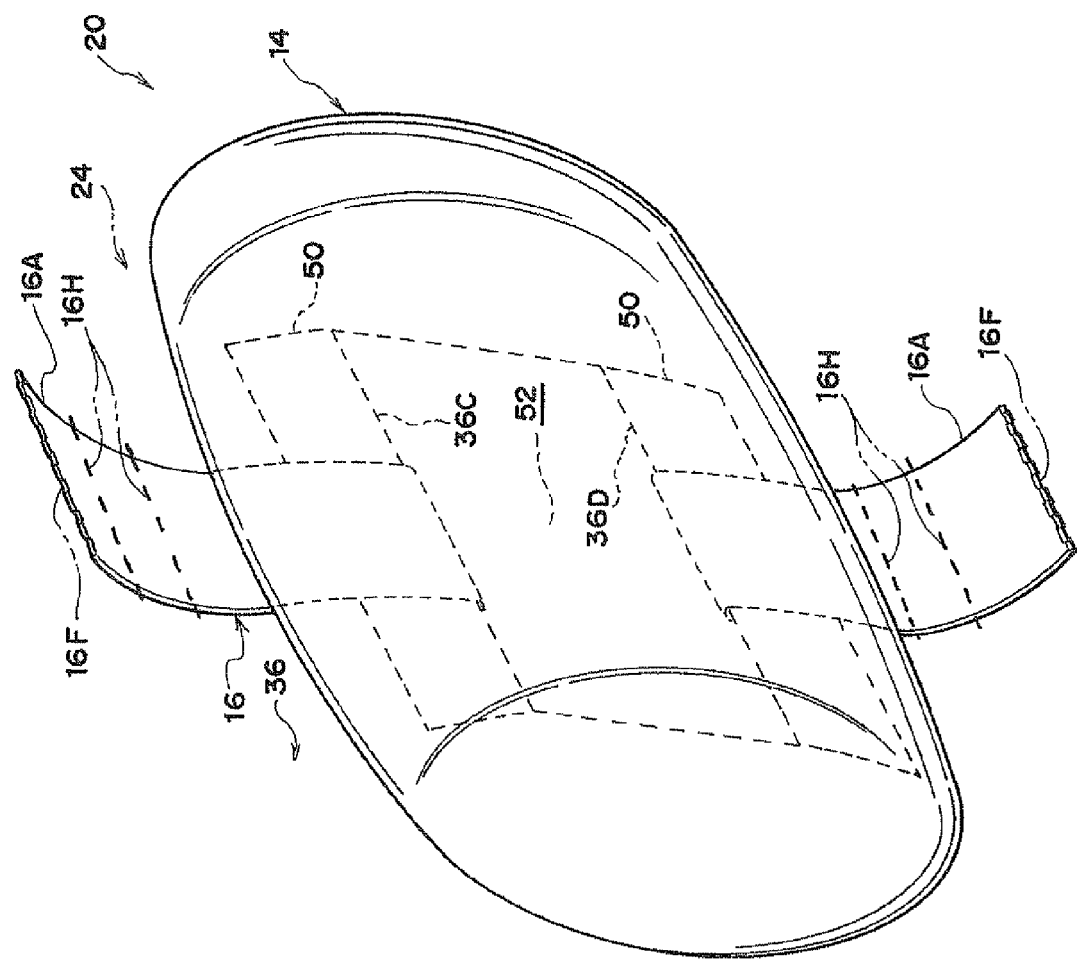
Figure 18:
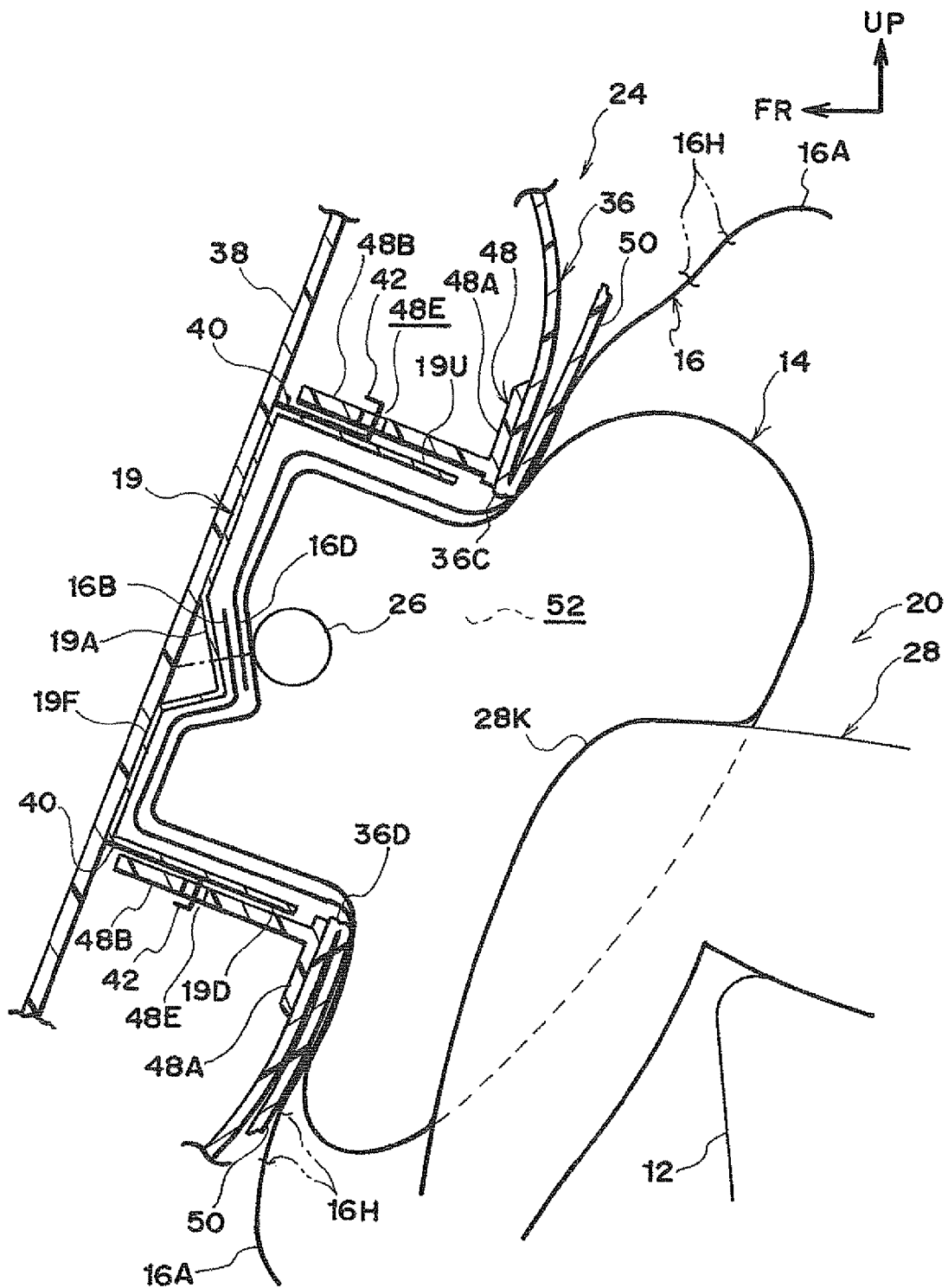

As shown in FIG. 16 and FIG. 18, when expansion and deployment of knee airbag 14 further progresses and a tensile force occurring at general portion 16A of flap 16 becomes equal to or greater than a predetermined amount, designated rupture portion 16F provided at general portion 16A ruptures. Consequently, since suppression of expansion and deployment of central region 14A of knee airbag 14 is released, knee airbag 14 can be expanded and deployed to its full size (full deployment). For this reason, at the time of a frontal collision of vehicle 18, when knee regions 28K of occupant 28 in front passenger seat 12 are well separated from glove box door 24 and not in a state of being close to glove box door 24, a reaction force of knee airbag 14 with respect to knee regions 28K of occupant 28 is sufficiently established and knee regions 28K can be appropriately restrained.

It should be noted that, in each of the above embodiments, although a non-stretchable cloth is given as an example of the deployment control cloth, the deployment control cloth is not limited thereto. As in the first embodiment, in the case of no surplus length portions being provided, the deployment control cloth may be provided with a certain amount of stretchability.

EXPLANATION OF REFERENCE NUMBERS 10 is a knee airbag device for a front passenger seat, 12 is a front passenger seat, 14 is a knee airbag, 14A is a central region, 14B are end portion regions, 14C are folded portions, 16 is a flap (deployment control cloth), 16A is a general portion, 16B is an end portion 16B at the vehicle lower side (one end portion), 16D is an end portion at the vehicle upper side, 16U is an end portion at the vehicle upper side (the other end portion), 18 is a vehicle, 19 is a module case (a housing), 19U is a vertical wall portion at the vehicle upper side, 20 is a knee airbag device for a front passenger seat, 22 is a glove box, 24 is a glove box door, 28 is an occupant, 28K are knee regions, 16F is a designated rupture portion, 16G are surplus length portions, 16H are controlled sewn portions, F is a width dimension of the flap, and W is a width dimension of the knee airbag.

The invention claimed is:

1. A knee airbag device for a front passenger seat, the knee airbag device comprising:

a knee airbag that is stored in a housing in a folded state when not deployed, the knee airbag including a central region in a vehicle width direction and end portion regions positioned at either side of the central region in the vehicle width direction and at a vehicle front of knee regions of an occupant seated in the front passenger seat, the knee airbag, after being folded in a vehicle vertical direction, being folded from both sides in the vehicle width direction to a center in the vehicle width direction and folded portions in the vehicle width direction being folded back again to the outer sides in the vehicle width direction within a range of end portion regions and being disposed at the end portion regions, and the knee airbag receiving a supply of gas at a time of a frontal collision of the vehicle and being configured so as to be capable of being expanded and deployed towards a side of the knee regions; and a deployment control cloth including a general portion configured to be narrower in the vehicle width direction than the knee airbag in a folded state, the general portion disposed so as to extend over the central region of the knee airbag in the vehicle vertical direction from a vehicle rear side and disposed so as to cover a part of the folded portions in the vehicle width direction from the vehicle rear side, the deployment control cloth suppressing expansion and deployment of the central region at a time of initial expansion and deployment of the knee airbag and initializing expansion and deployment of the end portion regions towards outer sides in the vehicle width direction before expansion and deployment of the central region, wherein one end portion of the deployment control cloth in the vehicle vertical direction is held in place between the housing and the knee airbag, and the other end portion of the deployment control cloth in the vehicle vertical direction is disposed between at least the knee airbag and a vertical wall portion of the housing and, at the time of initial expansion and deployment of the knee airbag, the other end portion is fixed and held between the vertical wall portion and the knee airbag device by expansion pressure, and breaking away from between the vertical wall portion and the knee airbag with progression of expansion and deployment of the knee airbag.

2. The knee airbag device for a front passenger seat of claim 1, wherein surplus length portions having a length corresponding to a permissible bulge amount of the central region towards an occupant side at the time of initial expansion and deployment of the knee airbag is provided at the general portion of the deployment control cloth.

3. The knee airbag device for a front passenger seat of claim 2, wherein surplus length portions are folded over the central region of the knee airbag when not deployed and are sewn at controlled sewn portions which are breakable under a tensile force which occurs at the deployment control cloth at a time of expansion and deployment of the knee airbag.

4. The knee airbag device for a front passenger seat of claim 1, wherein, in the vehicle width direction, a width dimension of the general portion of the deployment control cloth is configured to be one third or less of a width dimension of the knee airbag in a folded state.

5. The knee airbag device for a front passenger seat of claim 1, wherein the housing is provided inside a glove box door which constitutes an occupant side exterior wall of a glove box of the vehicle.

6. The knee airbag device for a front passenger seat of claim 1, wherein the one end portion is an end portion at a vehicle lower side of the deployment control cloth, and the other end portion is an end portion at a vehicle upper side of the deployment control cloth.

7. A knee airbag device for a front passenger seat, the knee airbag device comprising:
   a knee airbag that is stored in a housing in a folded state when not deployed, the knee airbag including a central region in a vehicle width direction and end portion regions positioned at either side of the central region in the vehicle width direction and at a vehicle front of knee regions of an occupant seated in the front passenger seat, the knee airbag, after being folded in a vehicle vertical direction, being folded from both sides in the vehicle width direction to a center in the vehicle width direction and folded portions in the vehicle width direction being folded back again to the outer sides in the vehicle width direction within a range of end portion regions and being disposed at the end portion regions, and the knee airbag receiving a supply of gas at a time of a frontal collision of the vehicle and being configured so as to be capable of being expanded and deployed towards a side of the knee regions; and
   a deployment control cloth including a general portion configured to be narrower in the vehicle width direction than the knee airbag in a folded state, the general portion disposed so as to extend over the central region of the knee airbag in the vehicle vertical direction from a vehicle rear side and disposed so as to cover a part of the folded portions in the vehicle width direction from the vehicle rear side, the deployment control cloth suppressing expansion and deployment of the central region at a time of initial expansion and deployment of the knee airbag and initializing expansion and deployment of the end portion regions towards outer sides in the vehicle width direction before expansion and deployment of the central region, wherein
   both end portions of the deployment control cloth in the vehicle vertical direction are respectively held in place between the housing and the knee airbag, and
   a designated rupture portion which ruptures when a tensile force which is equal to or greater than a predetermined amount occurs at the general portion, is provided at the general portion of the deployment control cloth.

* * * * *